United States Patent
O'Pray et al.

(10) Patent No.: US 11,546,657 B1
(45) Date of Patent: Jan. 3, 2023

(54) METHOD AND SYSTEM FOR ROLES BASED SELECTION AND CONTROL OF VIDEO CONTENT

(71) Applicant: Sector Media Group Incorporated, Park Ridge, NJ (US)

(72) Inventors: Bruce O'Pray, Park Ridge, NJ (US); George Eleftheriades, Glen Rock, NJ (US)

(73) Assignee: Sector Media Group Incorporated, Upper Saddle River, NJ (US)

(*) Notice: Subject to any disclaimer, the term of this patent is extended or adjusted under 35 U.S.C. 154(b) by 40 days.

(21) Appl. No.: 16/881,326

(22) Filed: May 22, 2020

Related U.S. Application Data

(60) Provisional application No. 62/878,649, filed on Jul. 25, 2019, provisional application No. 62/851,460, filed on May 22, 2019.

(51) Int. Cl.
*H04N 21/442* (2011.01)
*G06K 9/62* (2022.01)
(Continued)

(52) U.S. Cl.
CPC ..... *H04N 21/44218* (2013.01); *G06K 9/6201* (2013.01); *G06T 7/70* (2017.01);
(Continued)

(58) Field of Classification Search
CPC ............. H04N 21/44218; H04N 5/247; H04N 21/4223; H04N 21/41415; G06N 3/02; G08B 21/182; G06K 9/00228; G06K 9/00362; G06K 9/6201; G06K 2009/00322; H04W 4/14; G06T 7/70; G06T 2207/30196; G16H 40/20; G06Q 30/0273; G06Q 30/0269
See application file for complete search history.

(56) References Cited

U.S. PATENT DOCUMENTS

| 7,921,036 B1 | 4/2011 | Sharma et al. |
| 8,038,615 B2 | 10/2011 | Gobeyn et al. |
(Continued)

FOREIGN PATENT DOCUMENTS

WO   2006/081601 A1   8/2006

OTHER PUBLICATIONS

Ballendat et al., "Proxemic Interaction: Designing for a Proximity and Orientation-Aware Environment", Research Report 2010-962-11, (2010), pp. 1-10, Department of Computer Science, University of Calgary, Canada.

*Primary Examiner* — Tat C Chio
(74) *Attorney, Agent, or Firm* — Myers Wolin, LLC

(57) ABSTRACT

An embodiment of the present disclosure provides a method using a computing device to initiate play of media within a medical examination or treatment room. The method may include: capturing a plurality of images by a one or more image capturers; determining whether any persons are within a predefined boundary area in one or more of the images using a face detector or person detector; determining whether any persons are outside of the boundary area in one or more of the images using the person detector; and initiating play of media when a first person is determined to be within the predefined boundary area and no persons are determined to be outside of the boundary area in the images.

19 Claims, 19 Drawing Sheets

(51) Int. Cl.
    *G06T 7/70*     (2017.01)
    *H04N 5/247*     (2006.01)
    *H04N 21/414*     (2011.01)
    *H04N 21/4223*     (2011.01)
    *G08B 21/18*     (2006.01)
    *G06V 40/10*     (2022.01)
    *G06V 40/16*     (2022.01)
    *G06V 10/82*     (2022.01)
    *G06Q 30/02*     (2012.01)
    *H04W 4/14*     (2009.01)

(52) U.S. Cl.
    CPC ............. *G06V 10/82* (2022.01); *G06V 40/10* (2022.01); *G06V 40/161* (2022.01); *G08B 21/182* (2013.01); *H04N 5/247* (2013.01); *H04N 21/41415* (2013.01); *H04N 21/4223* (2013.01); *G06Q 30/0269* (2013.01); *G06Q 30/0273* (2013.01); *G06T 2207/30196* (2013.01); *G06V 40/178* (2022.01); *H04W 4/14* (2013.01)

(56) References Cited

U.S. PATENT DOCUMENTS

| | | | |
|---|---|---|---|
| 10,897,647 B1* | 1/2021 | Hunter Crawley | H04N 21/44 |
| 2005/0062238 A1 | 3/2005 | Broadfield et al. | |
| 2007/0174079 A1 | 7/2007 | Kraus | |
| 2016/0062719 A1 | 3/2016 | Romano et al. | |
| 2016/0224829 A1* | 8/2016 | Chou | G06T 7/11 |
| 2016/0335667 A1 | 11/2016 | Aubrey | |
| 2017/0309142 A1* | 10/2017 | Phillips | G08B 7/066 |
| 2018/0343499 A1 | 11/2018 | Eriksson et al. | |
| 2019/0065970 A1 | 2/2019 | Bonutti et al. | |
| 2019/0095957 A1 | 3/2019 | Ibarria et al. | |
| 2020/0112759 A1* | 4/2020 | Alameh | H04N 21/4532 |

\* cited by examiner

| | GENDER | AGE | FILE #1 INTRODUCTION | FILE #2 | FILE #3 | FILE #4 | FILE #5 | FILE #6 |
|---|---|---|---|---|---|---|---|---|
| | NONE | NONE | STORY-FSA | ADBRAND1-FSA | ADBRAND2-U | WRAP-FSA | ALERT | ADBRAND6-U |
| FEMALE | | SENIOR ADULT | ADBRAND3-FMA | STORY-FMA | ADBRAND2-FMA | ADBRAND4-FMA | WRAP-FMA | ALERT |
| | | MATURE ADULT | STORY-FYA | ADBRAND1-FYA | ADBRAND4-FYA | ADBRAND6-U | WRAP-FYA | ALERT |
| | | YOUNG ADULT | STORY-FCH | ADBRAND3-FCH | WRAP-FCH | ALERT | ADBRAND6-U | |
| | | CHILD | STORY-MSA | ADBRAND5-MSA | ADBRAND1-MSA | ADBRAND3-MSA | WRAP-MSA | ALERT |
| MALE | | SENIOR ADULT | ADBRAND6-U | STORY-MMA | ADBRAND2-MMA | WRAP-MMA | ALERT | |
| | | MATURE ADULT | STORY-MYA | ADBRAND5-MYA | ADBRAND3-MYA | ADBRAND4-MYA | WRAP-MYA | ALERT |
| | | YOUNG ADULT | ADBRAND3-MCH | STORY-MCH | ADBRAND6-U | WRAP-MCH | ALERT | |
| | | CHILD | | | | | | |

Fig. 2

| STATE | DESCRIPTION | CONDITIONS |
|---|---|---|
| 501 OFF-LINE | NOT OPERATIONAL | CAMERA MISALIGNMENT, SCHEDULED IDLE TIME, EXAM CHAIR NOT FOUND, OTHER ERROR CONDITION |
| 502 SETUP | AUTOMATIC EXAM CHAIR DETECTION | MANUAL ACTIVATION OR SYTEM STARTUP |
| 503 READY | IDLE STATE, AVAILABLE FOR PLAY | COMPLETION OF SYSTEM RESET OR TRANSITION FROM END STATE |
| 504 INITIAL PLAY | EXTRACT AGE AND GENDER DURING PLAY OF INTRODUCTORY VIDEO OR RESUME FROM PAUSE | PATIENT IN EXAM CHAIR WITH NO STAFF PRESENT |
| 505 PLAY | EXECUTE PLAYLIST USING AGE AND GENDER RESULT FROM INITIAL PLAY RESUME FROM PAUSE | PATIENT IN EXAM CHAIR WITH NO STAFF PRESENT |
| 506 PAUSE | PLAY PAUSED DUE STAFF MEMBER ENTERING ROOM | MUST BE IN PLAY STATE |
| 507 END | PLAY STOPPED | STOP BUTTON OR PLAY LIST CONCLUDED WITH PATIENT IN ROOM |

Fig. 5A

| OBJECT | STATUS | DESCRIPTION |
|---|---|---|
| PERSON | PHANTOM PERSON DETECTED | IDENTIFIES ALL OBJECTS IN UNPOPULATED EXAM ROOM THAT ARE DETECTED AS PEOPLE, INCLUDING DISPLAY ON MONITOR 101-1[WITH BOUNDARY BOXES AND SIZE FOR EACH DETECTED OBJECT |
| EXAM CHAIR | CHAIR DISPLAY | MONITOR VIEW WITH BOUNDARY BOXES AND TAG FOR OBJECT(S) DETECTED AS A EXAM CHAIR FOR CONFIRMATION BY INSTALLER |
| | EXAM CHAIR DETECTED | VALIDATE CAMERA 101-3 ALIGNMENT BY CONFIRMING THAT EXAM CHAIR APPEARS IN FOV AT LOCATION SAVED DURING SETUP |
| PATIENT | PATIENT PRESENT | PERSON DETECTED WITHIN EXAM CHAIR BOUNDARY BOX WITH FACE DETECTED AT LEAST ONCE AND CALCULATED CAMERA TO FACE DISTANCE WITHIN RANGE SETTINGS FOR EXAM ROOM |
| | PATIENT CHARACTERISTICS | RETURNS AGE, GENDER, EMOTION, ETHNICITY, ATTENTION SPAN, AND FACIAL SIGNATURE |
| STAFF MEMBER | STAFF MEMBER PRESENT | ANY DETECTED PERSON WHO (1) DOES NOT MEET THE PATIENT PRESENT CRITERIA, AND (2) HAS NOT ENTERED THE FOV FROM THE CAREGIVER ZONE 105 RESULTS IN A STAFF MEMBER PRESENT CONDITION. |

Fig. 6

METHOD AND SYSTEM FOR ROLES BASED SELECTION AND CONTROL OF VIDEO CONTENT

CROSS-REFERENCE TO RELATED APPLICATION

This application claims the benefit of U.S. Provisional Patent Application No. 62/851,460, filed May 22, 2019, and U.S. Provisional Patent Application No. 62/878,649, filed Jul. 25, 2019, the contents of each of which are incorporated by reference herein in their entirety.

FIELD

The present disclosure relates to methods and system for roles-based selection and control of video content.

BACKGROUND

Continuing innovations in display technology combined with declining display costs have facilitated massive deployments of digital signage in the retail sector. Traditional signage has been replaced with digital signage indoors at stores, restaurants, hotels, and public places like airports; and outdoors in locations ranging from bus stops to billboards and stadiums. More recently digital signage is being deployed at points of care in the healthcare sector; principally in medical waiting and exam rooms.

Companies are constantly looking for ways to increase the effectiveness of their advertising. Two metrics that apply to exam rooms are the number of patients that viewed an ad, and the average amount of time they spent viewing it. Engagement can be improved through use of (a) video instead of static images, (b) audio with video, and (c) larger screen sizes. Average viewing time can be improved through (c) initiation of media play automatically without requiring any action by the viewer, and (d) automatic resumption of play if it is paused during temporary staff member presence. Currently available digital wallboards represent a fairly straightforward content delivery approach in which preselected image playlists cause content to be displayed in accordance with a preset schedule or plan. This digital signage technique can readily be implemented using off the shelf digital signage content management systems, displays, and media players. Since this content delivery approach does not normally provide audio, it is minimally disruptive to patient/staff interaction and can continue operating during treatment; but falls short because it does not engage the viewer through a full motion video with audio experience. Current exam room video programming that includes audio relies on the patient to start, pause, and restart, video play. This opt in video programming must have controls convenient to the patient, be extremely intuitive to operate, and not interfere with medical activities. These requirements are generally met with digital tablets that are held by the patient, or mounted on a nearby stand. While this approach provides full motion video with audio it fails to meet the other criteria set forth in (b)-(d) above because it (i) delivers content through a small screen, (ii) relies on patient "opt in" to initiate the play of media, and (iii) doesn't automatically restart if play is stopped due to temporary staff member presence in the exam room.

SUMMARY

The methods of the present disclosure of delivering content may be preferable over existing approaches, for example, for at least one of the followings:

Patients find the method of the present disclosure more engaging since at least one wall mounted large screen embodiment includes full motion video and audio;

Patients find the method of the present disclosure more relevant since each video is, in one embodiment, specifically personalized based on the predicted age and gender of the viewer;

In one embodiment, the initiation of play is consistent and reliable because it occurs automatically without patient or staff involvement when the patient is unattended in the exam room;

In one embodiment, the pausing of play does not require patient or staff involvement since it occurs automatically when the system determines that a staff member has entered the exam room while a video is playing;

In one embodiment, premature video termination is decreased since staff is able to avoid entering the exam room until they receive automatic notification that the patient has finished viewing the selected content;

In one embodiment, the method of the present disclosure supports dynamic and continual improvement by collecting data relating to viewer emotion and engagement;

In one embodiment, automatic initiation and termination of play provides a basis for extremely accurate advertiser feedback and billing;

In one embodiment, the method of the present disclosure improves patient satisfaction by providing centralized reporting of exam room status, enabling staff to take corrective action if wait time thresholds are exceeded; and In one embodiment, the method of the present disclosure includes automated features that make it simple and inexpensive to install.

An embodiment of the present disclosure provides a method using a computing device to initiate play of media within a medical examination or treatment room. The method may include: capturing a plurality of images by a one or more image capturers; determining whether any persons are within a predefined boundary area in one or more of said images using a face detector or person detector; determining whether any persons are outside of said boundary area in one or more of said images using the person detector; and initiating play of media when a first person is determined to be within the predefined boundary area and no persons are determined to be outside of the boundary area in the images.

In one embodiment, the method may include: determining a facial signature for the first person within the boundary area; comparing said facial signature to data within a preexisting sample facial signature repository; and preventing the initiation of play of media if said facial signature matches a sample facial signature in said repository.

In one embodiment, the method may include: estimating an age and a gender of the first person by a deep neural network using a face detector; and selecting media to be played based at least partially on the estimated age and gender.

In one embodiment, the method may include using y coordinate filtering to (a) distinguish persons near doorways outside said medical examination room from persons inside said medical examination room or (b) differentiate persons within the boundary area from persons in front of the boundary area.

In one embodiment, the one or more image capturers may further includes using a plurality of cameras with known separation to determine a location of persons within a combined field of the plurality of cameras through trigonometric calculation to (a) distinguish persons near doorways outside said medical examination room from persons inside said medical examination room or (b) differentiate persons within the boundary area from persons outside the boundary area.

In one embodiment, persons in said medical examination room have access to a stop control that causes media play to stop and prevents any play of media from resuming until a pre-defined condition for resumption of play has been met.

In one embodiment, the determination of whether any persons are within the predefined boundary area identifies only persons wholly within the predefined boundary area, and the determination of whether any persons are outside of the boundary area identifies only persons who are in the images but wholly outside the boundary area.

In one embodiment, the method may include: after initiating play of media, capturing at least one additional image by the one or more image capturers; determining whether a person has entered the field of view from a predefined visitor area in the at least one additional image; designating said additional person to be a visitor; and preventing the presence of such designated visitor from stopping the play of media.

In one embodiment, the method may include: after initiating play of media, capturing at least one additional image by the one or more image capturers; determining whether any persons are outside of the predefined boundary area in the at least one additional image; stopping the play of media if a second person is determined to be outside of the predefined boundary area in the at least one additional image; and saving a location within said media where said stopping of play occurred.

In one embodiment, the method may include: setting a lockout indicating presence of a second person outside said predefined boundary area to prevent any play of media from resuming until a pre-defined condition for resumption of play has been met.

In one embodiment, the method may include: after stopping the play of media, capturing at least one additional image by the one or more image capturers; determining that the second person has exited a field of view of the one or more image capturers; determining that no persons are outside of the predefined boundary area in the at least one additional image; retrieving the saved location within said media; and causing play of media to resume from the saved location.

In one embodiment, the method may include, after setting a lockout: determining that a person has exited a field of view of the one or more image capturers; determining that no persons are outside of the boundary area in the at least one additional image; clearing a lockout to allow media to resume play.

In one embodiment, the method may include: determining that said media has concluded play, reached a notification token in a playlist, or a media stop request has been made through a stop control; and sending a short message to at least one previously identified mobile device indicating that a patient is available, the message containing an identity of the corresponding medical examination room in which said media played.

In one embodiment, the method may include: determining that said media has concluded play, reached a notification token in a playlist, or a media stop request has been made through a stop control; and sending a message through a network to a mobile notification application indicating that the first person is available, the message including a location in which said media played. Said mobile notification application causes a message to be displayed that indicates that the first person is ready, the message containing an identity of a corresponding medical examination room in which said media played.

In one embodiment, the message is only displayed at the mobile device if the corresponding medical examination room is in geographical proximity to the mobile device as indicated by pre-set GPS coordinates.

In one embodiment, a mobile notification application that transmits the short message supports filtering of messages associated with a specific geographical location by medical examination room within said location.

In one embodiment, an alarm is provided each time that a patient remains unattended in excess of a preset interval.

In one embodiment, the method may include: processing, by a content management system, messages delivered to obtain aggregate waiting time for the patient, and indicating patients that have wait times exceeding a pre-established threshold.

Another embodiment of the present disclosure provides a system for initiating play of media within a medical examination or treatment room. The system may include: a single or plurality of image capturers configured to capture a plurality of images; a face detector or person detector; a storage configured to store media: and processor circuitry. The processor circuitry is configured to: determine whether any persons are within a predefined boundary area in one or more of said images using the face detector or person detector; determine whether any persons are outside of said boundary area in one or more of said images using the face detector or person detector; and initiate play of the media when a first person is determined to be within the predefined boundary area and no persons are determined to be outside of the boundary area in the images.

Another embodiment of the present disclosure provides a method of using a computing device to pause play of media within a room. The method may include: playing media within the room; continuously capturing a plurality of images through one or more image capturers; determining whether any persons are outside of said boundary area in one or more of said images using the person detector; and causing the play of media to stop upon determination that any persons are outside of the predefined boundary area in one or more of said images. The video may then resume if the system once again determines that a person is in the predefined boundary area and no other persons are present.

In one embodiment, the method may include: saving a location within said media where said stopping of play occurred; continuing to capture the plurality of images; determining whether any persons are within a predefined boundary area in one or more of said images using a face detector or a person detector; determining whether any persons are outside of said boundary area in one or more of said images using the person detector; and causing the play of media to resume upon a determination that a person is within the predefined boundary area and that no persons are outside of the predefined boundary area.

BRIEF DESCRIPTION OF THE DRAWINGS

FIG. 2 provides an example of a play list table for use with one embodiment of the method and system of the present disclosure.

FIG. 5A is a state table that lists all operating states along with the conditions that comprise them in accordance with one embodiment of the method and system of the present disclosure.

FIG. 6 contains a table that describes relevant dynamic and static objects within the room that are detected by the object manager in accordance with one embodiment of the method and system of the present disclosure.

FIGS. 11A and 111B show the process that is followed in transitioning from the initial play state to the play, pause, ready, or end states in accordance with one embodiment of the method and system of the present disclosure.

DESCRIPTION OF THE PREFERRED EMBODIMENTS

Figure 1:
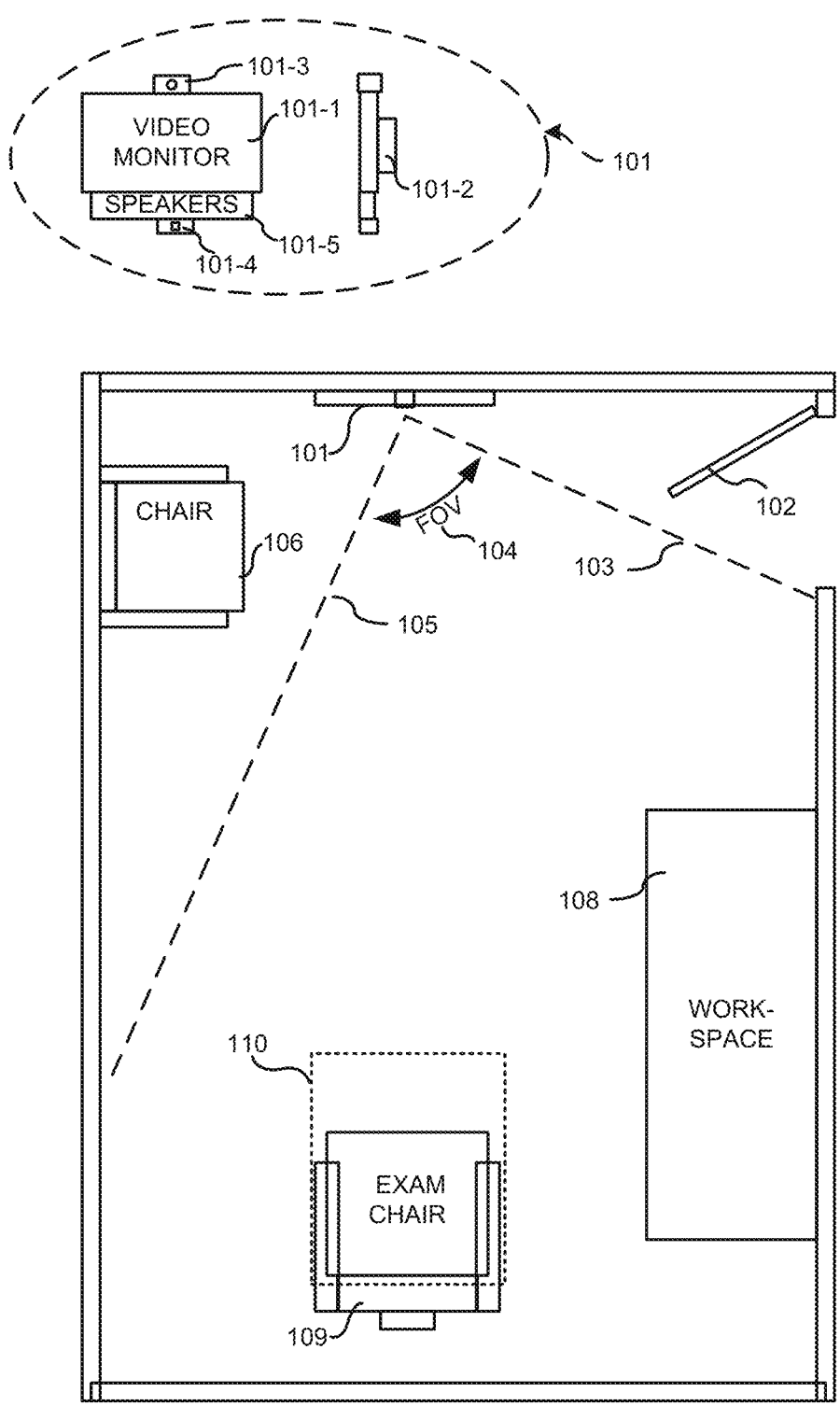
FIG. 1 shows a representative medical examination/treatment room illustrated for use with one embodiment of the method and system of the present disclosure.

The description of illustrative embodiments according to principles of the present invention is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 provides a representative medical examination/treatment room for illustrating one embodiment of the system and method of the present disclosure that is configured for specialties like optometry, ophthalmology, and dentistry in which such rooms have exam chairs. The room includes a platform 101 for the delivery of video programming consisting of a computer 101-2; a media display device or assembly, such as a video monitor 101-1 with speakers 101-5; a stop push button 101-4 or other user accessible means of inputting a stop command to the edge computer; and at least one image capturer, such as a sensor or camera 101-3. The camera(s) has a field of view (FOV) 104 that may cover areas within the exam room necessary to determine basic room population, changes, in said room population, and a predefined boundary area 110, such as a definition of the area at and around the exam chair 109 that may be necessary for the detection of a seated patient.

It is noted that while medical examination rooms, sometimes referred to as exam rooms, and treatment rooms are discussed in detail, the methods and systems described can be similarly implemented and deployed in other contexts, such as medical patient rooms, or other rooms in which a person seeking a service may wait for a service provider.

During a typical patient visit, a staff member escorts the patient into the room through the door 102 and seats him or her in the exam chair. In some embodiments, exam rooms are also equipped with visitor chair(s) 106 for any family members or visitors that may be with the patient. The staff member may then perform a variety of administrative or housekeeping tasks; such as cleaning surfaces the patient may come in contact with during the exam or reviewing the patient's medical record at the workspace 108. These movements and activities are captured in image frames by the image capturers and are sent to the computer for processing.

Once the staff member completes his or her tasks, he or she typically exits the exam room and the patient waits for the doctor or another staff member. This change in room population is evidenced in the video frames provided by the camera enabling the edge computer to determine that the patient is no longer attended by a staff member. The computer then uses images of the patient's face to estimate information about a patient, such as the patient's age and gender and selects appropriate video files to play from an inventory stored in the edge computer's memory in accordance with a play list that provides a lineup of video files to be played for each such age and gender. These video files are initiated and continue to play until stopped. Such a stoppage may be because (a) the selected video lineup is completed, (b) the patient opts out by pressing the stop button, (c) a staff member presses the stop button, or (d) the patient leaves the room. It is noted that while a stop button is mentioned, any stop control that causes media play to stop may be used. In typical embodiments, if a staff member enters the room while video is playing, the video is placed in the pause state. Such a pause state causes media play to stop and prevents any play of media from resuming until a pre-defined condition for resumption of play has been met. For example, if said patient is subsequently unattended, the video automatically exits the pause state and resumes. At the conclusion of treatment, when all parties leave the room, the platform resets and is ready for the next patient.

In one embodiment, the platform can be organized so that it assigns roles to individuals other than the patient based upon that person's location relative to the camera FOV. Individuals that are first detected in the FOV after video play has started from the door side 103 can be considered to be staff members resulting in a pausing of the video while individuals first detected in the FOV from the visitor side 105 can be considered visitors and the video can continue to play until one of the conditions described in (a)-(d) above occurs.

FIG. 2 provides a representative play list 201 that could be supported by one embodiment of the present disclosure. The playlist contains columns for gender 202, age 203, and file names 204 with each row, after the first row, providing a video lineup of files corresponding to a particular age and gender. In this embodiment, the first row is reserved for an introduction file 205 that attracts the patient's attention to increase the likelihood that the resulting camera image will have sufficient facial features to allow accurate age and gender prediction. The introduction is then followed by the rest of the lineup in sequence; including, in the embodiment shown, a story 206 to educate and interest the viewer, advertisements to generate revenue 207, and an ending "wrap" 208 that functions as a close to the lineup.

Since exam room doors are often closed, it can be difficult for staff members to know when video play has concluded and the patient is waiting for them. This may be addressed through use of an alert request 209 that, when reached in the playlist, causes staff member notification through mobile messaging devices. This particular approach to playlists is one of many such arrangements that are contemplated. It is simple and flexible since (a) different types of files are not locked into specific positions within the playlist, (b) it can support any combination of content types and, (c) content is played based on its position in the table so that any mix of targeted and non-targeted content can be used in the same row. This is exemplified by the senior adult female lineup that starts with a story 206 and includes an ad 210 after the alert; while the male child lineup starts with an ad 211 and has no content after the alert.

Figure 3:
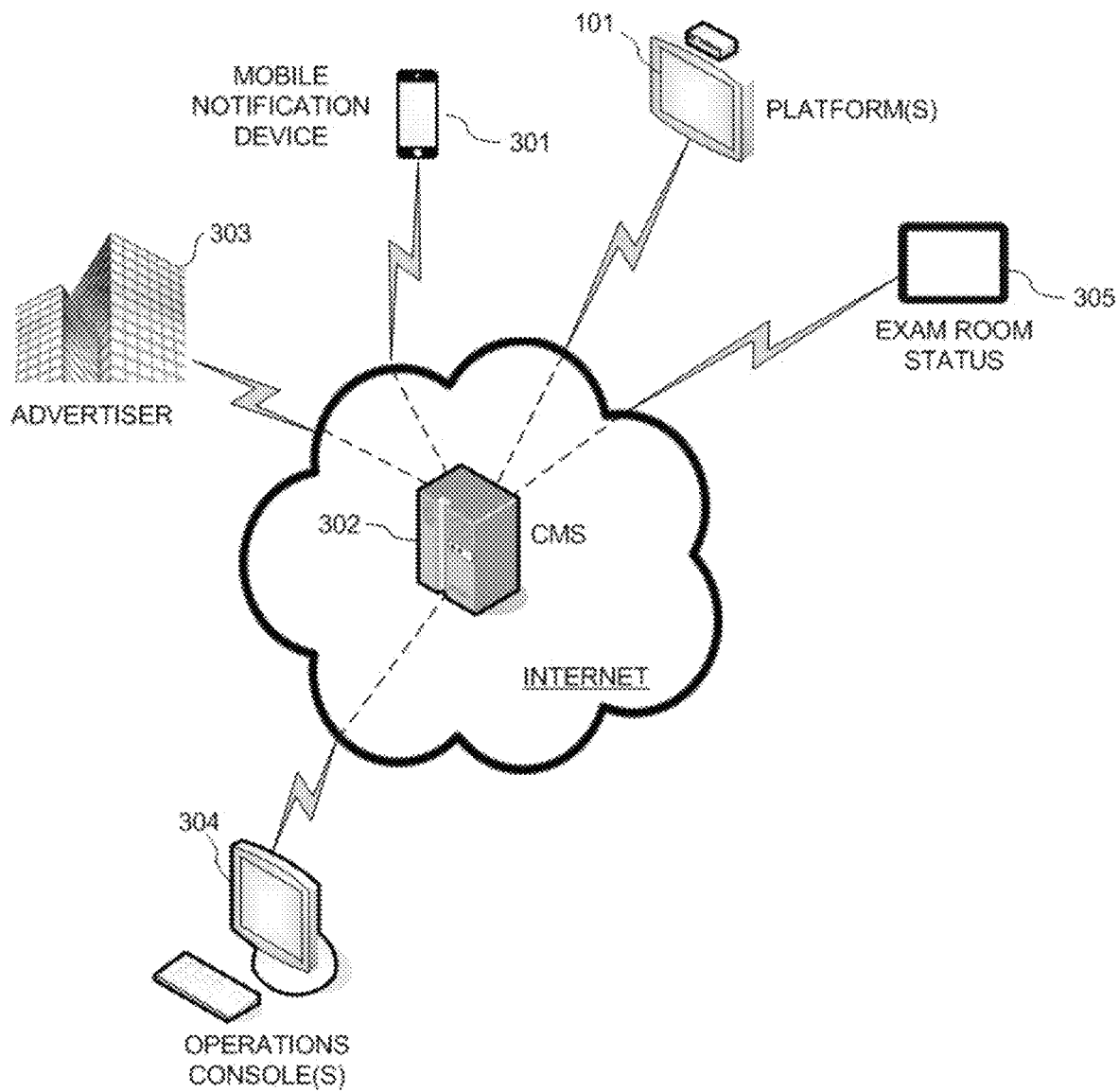
FIG. 3 illustrates a system level embodiment that includes the present disclosure.

FIG. 3 shows one embodiment of a system level interrelationship of components of an overall advertising system that utilizes the current disclosure. Typically, many platforms 101 communicate with a Content Management System ("CMS") 302 to download playlists 201; configuration settings; video content; and software updates. In one embodiment of the present disclosure, the platform uploads proof of play information to the CMS for each video that is played, typically including file name, time, date, exam room, viewer attention span, emotion displayed during play along with each patient's age and gender. The CMS includes an application that creates invoices for advertisers 303 from the proof of play data provided by the platforms associated with it. The operations console 304 provides access to the CMS and remote platforms for installation support, platform configuration settings, playlist creation, uploading/downloading of video content, and maintenance functions. Patient waiting messages are created by the CMS and sent to designated smartphones and other mobile notification devices 301 as it receives alert requests 209 from associated platforms. The CMS can also use information it receives from platforms to provide status messaging to exam room touch screen computers 305 that display the patient wait times of all associated platform equipped exam rooms in the same practice location, thereby enabling staff members to address excessive delays. Patient wait times can also be aggregated for periodic reporting purposes.

Figure 4:
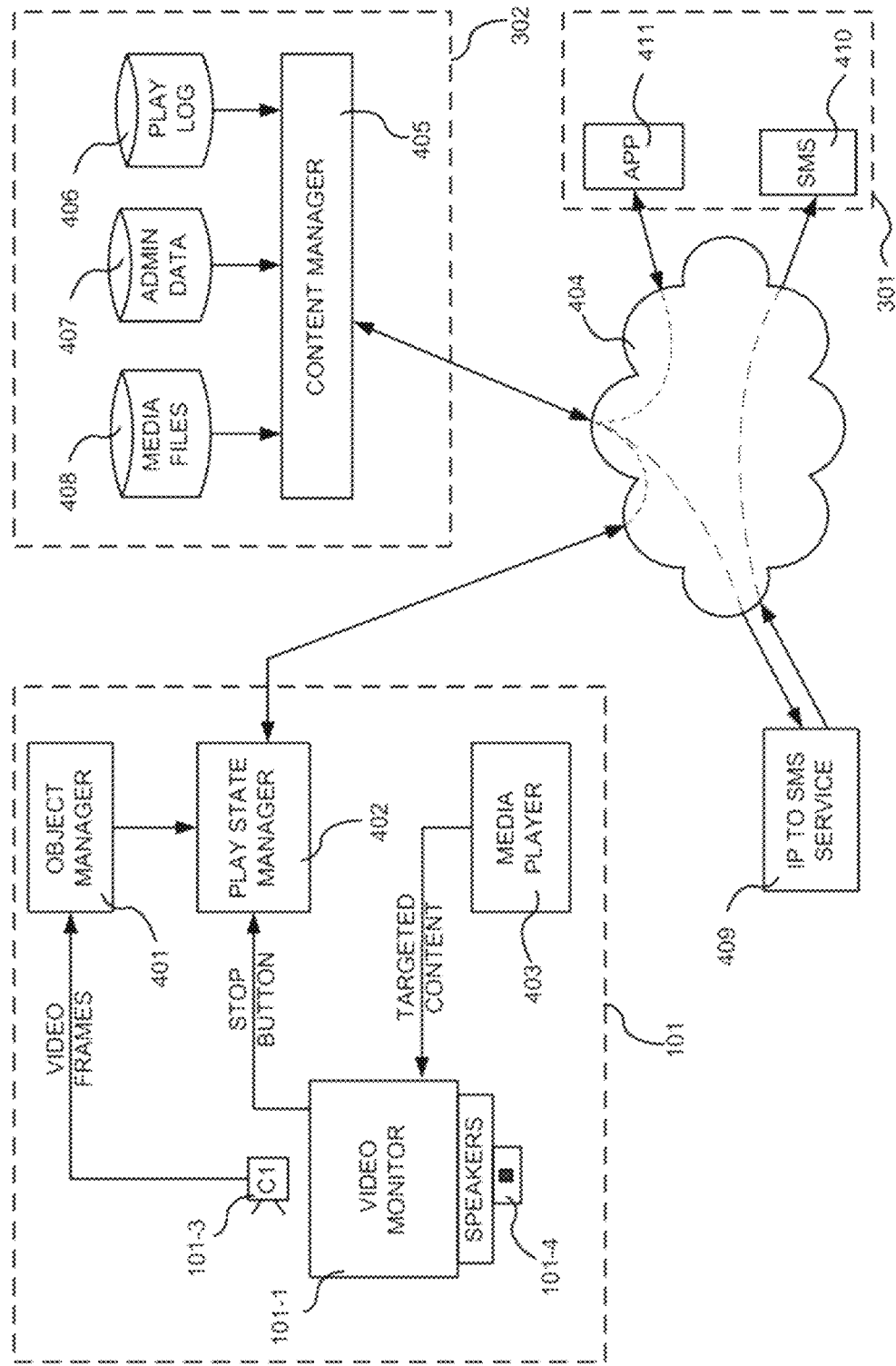
FIG. 4 is a diagram that shows the major functional blocks that comprise one embodiment of the method and system of the present disclosure.

FIG. 4 illustrates the relationship of the major functional blocks within an implementation of the platform 101 and CMS 302 for one embodiment of the present disclosure. The video camera(s) 101-3 provide video frames containing images of the room to an object manager 401 that (a) identifies people within the room as well as inanimate objects, such as exam chairs 109, that are relevant to video delivery and, (b) photographs or anatomical models that could be incorrectly classified as people and thereby cause the system to perform incorrectly. This embodiment of the object manager also provides (a) data regarding the room population that may be necessary to determine whether a video should be started, paused, or ended; (b) demographic information that may be needed to select the video playlist; and (c) patient interest metrics that include attention span and exhibited emotions.

The data regarding room population from the object manager along with the condition of the stop button 101-4 are periodically updated and provided to the play state manager 402 to control the start and stop of video play. Age, gender, attention span, and emotion data from the object manager are also provided to the play state manager to facilitate selection of video content and for reporting functions. Other types of information are also contemplated. The media player 403 then, in response to play commands from the play state manager retrieves the media content from local storage and sends it to the video monitor 101-1 for display; including sound. In this embodiment, the content manager can also provide exam room patient waiting messages to staff member mobile notification devices 301 through (a) a Short Message Service provider 409 to SMS capable notification devices 410; or (b) smartphones or other application capable devices 411 over suitable communications facilities 404.

The CMS is the central repository and clearinghouse for all associated platforms. In this embodiment, it consists of a content manager 405 and associated data. Media files 408 include the video content and ad files that are downloaded to match the playlist inventory of each individual platform. Administrative data 407 contain the information needed to install, maintain, operate, and interact with advertisers 303; such as playlists, platform configurations, site locations, site contact data, service histories, advertiser profile data, and invoices. The play log 406 contains video completion information received from the play state manager that may be necessary to issue invoices to advertisers and measure video effectiveness. Invoices in this embodiment include the time, date, duration, and demographic data for all videos that completed play for a given time period and specific billing entity. Attention span, emotion, and opt outs through the stop button can be aggregated and then used to judge reaction to individual video files as well as the effectiveness of various combinations of advertising and/or content files.

Figure 5B:
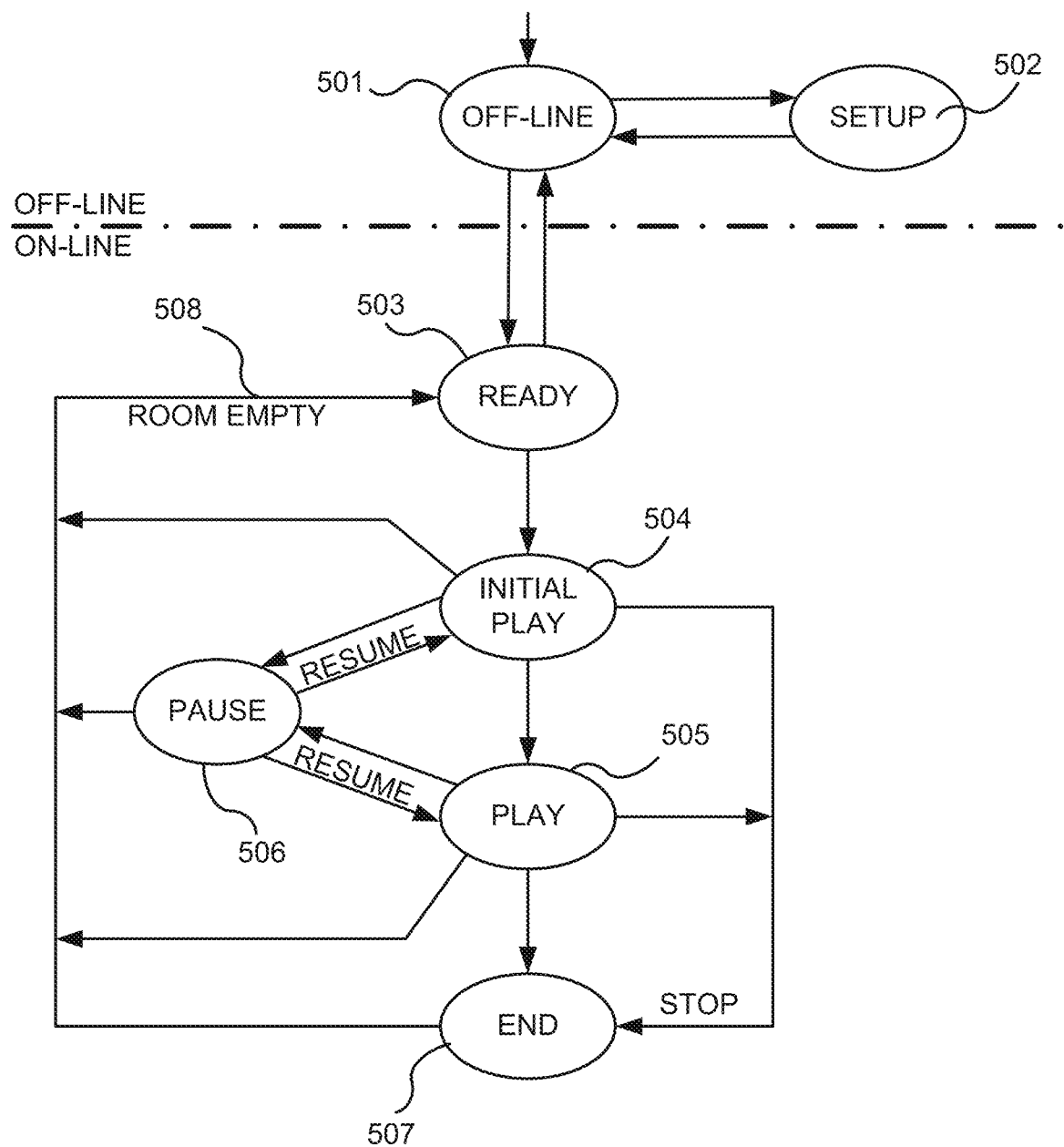
FIG. 5B is a diagram that shows the transition paths between states in accordance with one embodiment of the method and system of the present disclosure.

FIGS. 5A and 5B together describe the states that the play state manager can be in and the transitions between those states in one embodiment of the present disclosure. A platform in the off-line state 501 can load files to or from the CMS and be accessed remotely through the Internet, or locally by connecting a keyboard, for maintenance purposes. The play state manager can enter the setup state 502 through operator command or automatically enter the ready state 503 if necessary initialization conditions are detected. The setup state is used during installation to (a) set operations parameters, (b) establish the location of the exam chair 109, (c) define a boundary area 110 encompassing the exam chair and surrounding space that a patient's head, arms, and feet may extend to while said patient is waiting for treatment, and (d) provide a means of detecting and eliminating inanimate objects that can be misclassified as people.

In addition to entry from the off-line state, the play state manager may enter the ready state from any other on-line state as a result of the exam room becoming empty. If the play list 201 includes an introduction file 205, then the initial play state 504 is entered from the ready state after detection of a patient in the exam chair with no staff present. For example, in one embodiment, it may be determined whether any persons are within the predefined boundary area 110 in one or more of said images using a face detector or person detector. It may also be determined whether any persons are outside of said boundary area 110 in one or more of said images. Play of the media may be initiated when a first person is determined to be within the predefined boundary area 110 and no persons are determined to be outside of the boundary area 110 in the images.

The discussion herein refers to persons determined to be within or outside of the predefined boundary area 110. In some embodiments, persons who are partially within the boundary area may be considered within the predefined boundary area 110. In other embodiments, patients are only considered to be within the predefined boundary area 110 if they are wholly within the predefined boundary area.

The play state 505 is entered upon completion of the introduction file. The previously captured demographic data is used to select targeted content from the play list 201 and the play of video files is initiated. The pause state 506 causes video play to stop as a result of the detection of a staff member, or other person, entering the room. Video play resumes from the pause state to the prior play or initial play state as a result of such person(s) leaving the room; or to the ready state as a result of all persons leaving the room. The end state 507 is entered as a result of the depression of the stop button 101-4 or conclusion of the play list. The end state is maintained until all persons leave the room and the ready state is entered or the platform is reset and subsequently enters the off-line state.

In another embodiment, after the initial play state 504, the image sensor or camera 101-3 may continuously capture a plurality of images. Then, it may be determined whether any persons are within the predefined boundary area 110 in one or more of said images by using a face detector or a person detector. It may further be determined whether any persons are outside of said boundary area 110 in one or more of said images by using a person detector. If the system is within the play state 505, the pause state 506 may be entered, where the play of media may be caused to stop, upon determination that no persons are within the predefined boundary area 110 or that any persons are outside of the predefined boundary area 110 in one or more of said images. When the system is in the pause state 506, the play state 505 may be entered, where the play of media may be resumed upon a determination that a person is within the predefined boundary area 110 and that no persons are outside of the predefined boundary area 110. In this way, if a video is playing, the video may be stopped if the patient leaves the predefined boundary area 110 or if an additional person enters the room. The video may then resume if the system once again determines that a person is in the predefined boundary area 110 and no other persons are present.

FIG. 6 shows one embodiment of the status conditions 601 provided by an object manager 401 for each of the objects that it identifies. The status for phantom person 602 is used during installation and for troubleshooting to eliminate digital signage, photographs, or anatomical models that could be detected as persons through adjustment of minimum size thresholds, physically removing them from the room, or placing them outside the FOV 104. The chair status 603 identifies the location of a chair normally used by visitors that may accompany the patient. This information can be used by the play state manager 402 to allow video play even though more than one person is present in the room. Detection of the location of the exam chair 604 streamlines installation by enabling an installer to simply confirm an automatically identified area in which a patient may be present for video play to be initiated; and is used during platform startup to confirm that patient facing camera (s) are correctly aimed and operating properly. The patient present 605 and staff member 607 status is used by the play state manager 402 to determine when to enter the various states described in FIG. 5A. The patient characteristics 606 may be used (a) for targeting of content, (b) to indicate patient engagement by providing attention span and the duration of various estimated emotions, and (c) to differentiate patients from staff through comparison of facial signatures.

Figure 7:
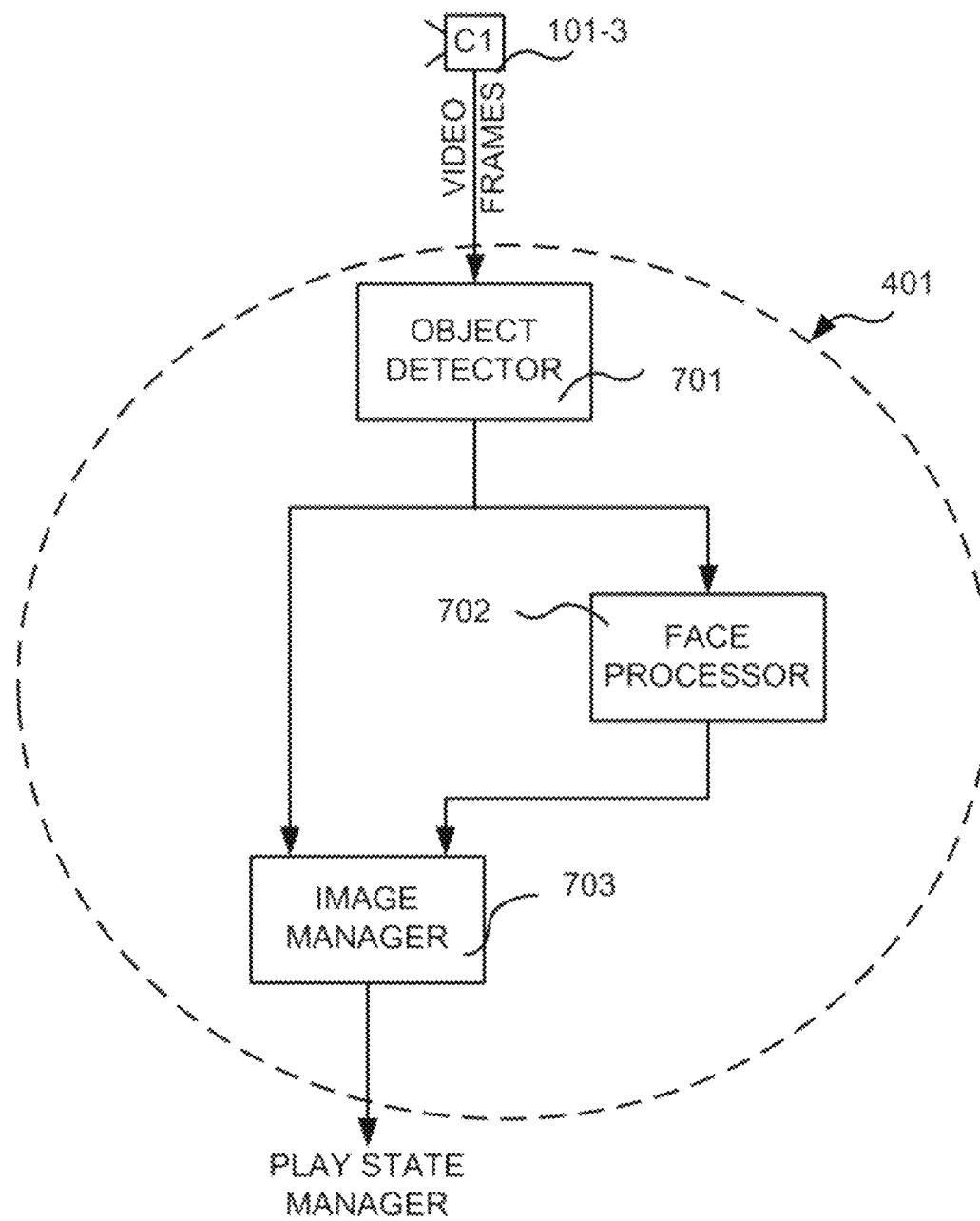
FIG. 7 is a block diagram of the object manager that detects and classifies people and furniture in accordance with one embodiment of the method and system of the present disclosure.

FIG. 7 shows the functional blocks that comprise the object manager 401 in the current embodiment. One or more video cameras 101-3 provide video signals containing images of the room to an object detector 701 that identifies relevant dynamic objects within the room such as people and pets as well as static objects like exam chairs, photographs of people, and anatomical models. Real time deep learning object detectors such as YOLO, SSD, and R-CNN selected to meet the accuracy, throughput, and reliability requirements of specific applications can be used to perform this function with the resulting output being the type, location, and bounding box coordinates for each object. In some embodiments, multiple cameras with known separation may be used to determine a location of persons within the shared field of view the multiple cameras; with said location including trigonometric calculation of distance from a known reference point. The use of stereo camera configurations with associated software that provides the three-dimensional location of each pixel in the combined camera view can provide additional functionality. Use of this camera technology facilitates the detection of objects based upon their height, width, and distance from any other surfaces they are adjacent to. This can be used to provide an outline of the person or a bounding box. By way of example, person detection that is adequate for many applications can be effected through depth based object "outlining," minimum bounding box dimensional thresholds, and minimum bounding box movement threshold; based on tracking of said bounding box using a common object tracking methodology. For purposes of clarity, (a) "person detection" as used herein refers to both two and three dimensional object detection using a neural network as well as the three dimensional approach that, at a minimum, considers object size and movement, and (b) "object detection" is a neural network based methodology that may be implemented in two or three dimensions and is trained for specific actionable physical objects such as exam chairs, exam tables, rolling stools, and people.

A face processor 702 may include a face detector that extracts the facial component of a larger image and provides the resulting facial image to appropriate computer vision models for analysis. This includes generation of facial signatures used for identification of staff members and returning patients; estimates of age, gender, and emotion; calculation of attention span based on facial orientation; and measuring the distance between said patient's eyes for estimation of distance of patient from the camera. Extraction of said facial data is well understood as exemplified by the fact that it can be obtained through licensed software like Quividi as well as multiple open source reference implementations that utilize the resources of OpenCV.

The object detector and face processor results are provided to the image manager 703 where they are used to generate the status conditions set forth in FIG. 6. In one embodiment of the setup state, installation and maintenance personnel are provided with bounding boxes on the video monitor 101-1 that identify (a) any phantom persons 602 identified by the object detector that could prevent proper starting and stopping of video play and (b) any chairs 603 identified by the object detector so the location of exam and visitor chairs can be confirmed.

In this embodiment, the patient present 605 state is conditioned upon the object detector identifying a person with a bounding box that falls within the patient boundary area 110, a detected face within said person's bounding box, and an estimated minimum distance from the camera that is within a preset range. This distance estimation differentiates a person sitting in the exam chair who is classified as a patient from a person located in front of said exam chair who does not qualify as a patient in accordance with common advertiser billing criteria. Said distance can be made through triangulation based upon (a) known data regarding the distance between adult human eyes in single camera implementations and, (b) the alignment of images or location of a common spot, for installations that utilize multiple, or stereo cameras.

Differentiation between likely patients and staff members can also be accomplished by comparing the facial signature of said person sitting in the exam chair with previously captured facial signatures classified as staff members at that location. In such an embodiment, the method may then determine a facial signature for a person within the boundary area 110 and then compare that facial signature to data within a pre-existing sample facial signature repository. If the facial signature of the person within the boundary area 110 matches a sample facial signature from the repository, the system may prevent play, since the person within the boundary area 110 is likely to be a staff member.

In this embodiment, the staff member present 607 status condition is met by an object classified as a person that does not meet the patient present criteria, does not have a bounding box that materially coincides with any visitor chair within the FOV 104, and has not entered the FOV from the direction of the visitor side 105. In some embodiments, staff member activity around the room during treatment can create occlusion and/or body positions that fail to result in a staff member being consistently detected. Said consistency can be improved through the use of one or more additional spatially separated cameras that parallel process images representing different views of the same objects. Another methodology that can be implemented to address said inconsistent staff member detection is the use of a lockout in which the initial detection of a staff member causes the image manager to lock the staff member status in the present state and not change said present state until an individual is detected as exiting in the direction of the door side 103; and no other persons are detected outside the boundary area 110 after said exit. Typically, once a lockout is set, such a lockout prevents any play of media from resuming until a predefined condition for resumption of play has been met. Such a condition may be any of the conditions discussed herein. For example, once a lockout is set, it may remain in place until a person has been detected to have left the room. Only after such a condition has been satisfied would the system then resume play even if a patient is detected to be in the predefined boundary area 110 and no persons are detected to be in the images outside of the predefined boundary area.

For some embodiments it may be advantageous to include the entry door in the field of view. This may require the elimination of persons detected through the doorway that are located outside the room. This can be accomplished through stereo/multi-camera measurement of distance to the detected person or y coordinate filtering which (a) may require the bottom edge of the vertical field of view of the door facing camera to intersect the floor inside the room in the area of the door, and (b) uses triangulation based on the height of the camera, distance to said floor intersection, and y distance between the bottom of the vertical field of view and the bottom of the bounding box of the person standing at the door to estimate the distance that said person is past said bottom edge of said vertical field of view.

Figure 8:
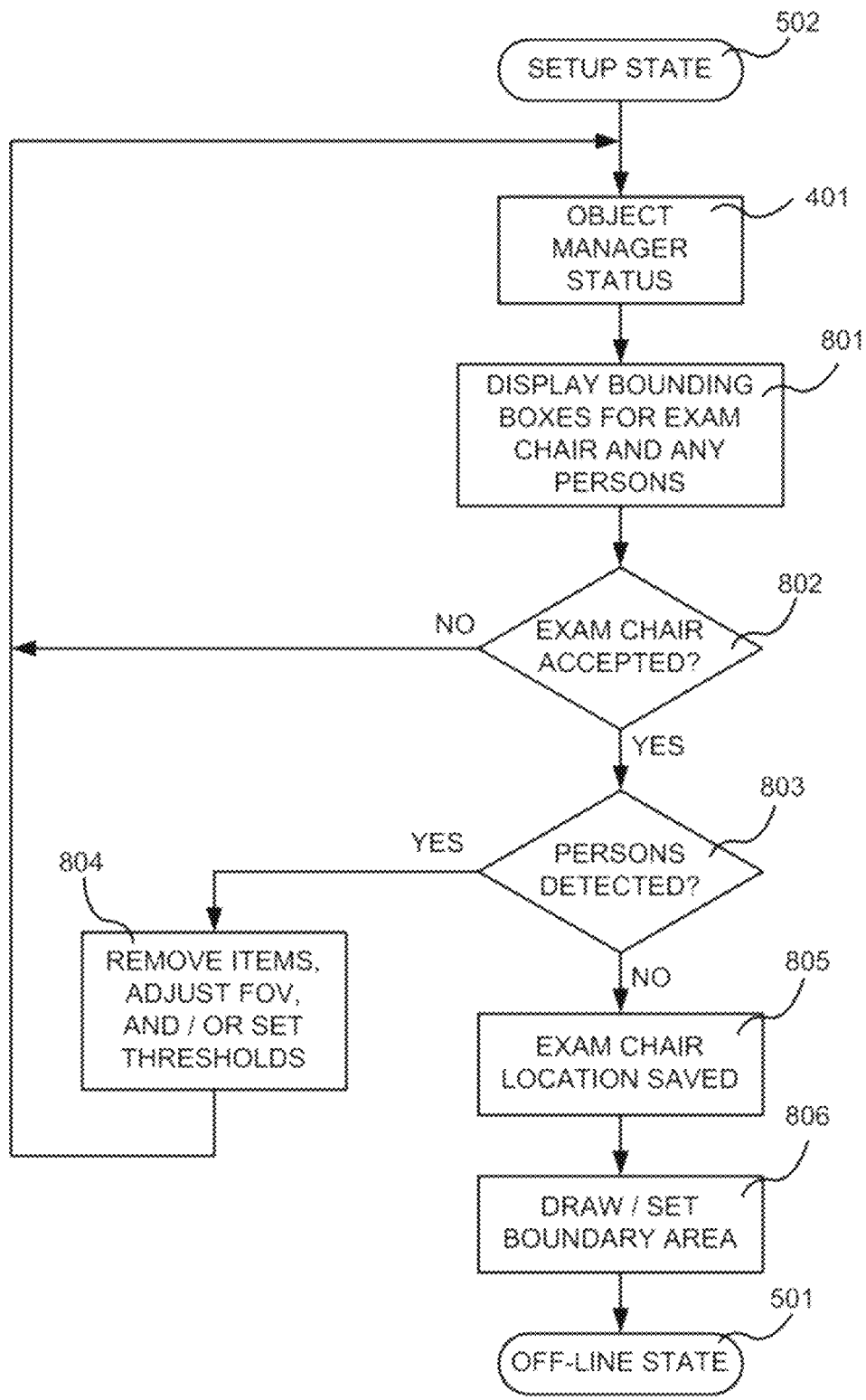
FIG. 8 is a diagram that shows the process that is followed in an unoccupied exam room during the setup process to identify exam chairs and objects that may cause false detection in accordance with one embodiment of the method and system of the present disclosure.

FIG. 8 shows a process that is followed in the setup state 502 in FIG. 5B to configure an embodiment of the present disclosure that supports single camera 101-3 installation and maintenance activities. Said process includes a method for identifying the exam chair, establishing its associated boundary area 110, and ensuring that phantom people 602 are not considered by the play state manager 402. The first step is to aim the camera to obtain the desired FOV 104; with all live persons then leaving said FOV to provide an unobstructed view of an unpopulated room.

Video frames received from the camera are then processed by the object manager 401 resulting in the display of all detected chairs and phantom persons 801 with their associated bounding boxes. This provides the installer or service person the opportunity to adjust the camera to properly position the exam chair bounding box 802 within the FOV and then (a) remove inanimate physical objects identified as phantom persons on the display, and/or (b) set height or area thresholds at levels where phantom persons don't create false positives 804 but the smallest person that would be expected in the FOV is still detected at the maximum distance that such a person would be from the camera. Once these tasks have been accomplished, the operator is able to accept the exam chair location 805 and define a box 806 that sets the predefined boundary area 110. The play state manager then enters the off-line state in single camera installations or executes (a) the process described above, and/or (b) the process described above without exam chair detection for additional cameras.

Figure 9:
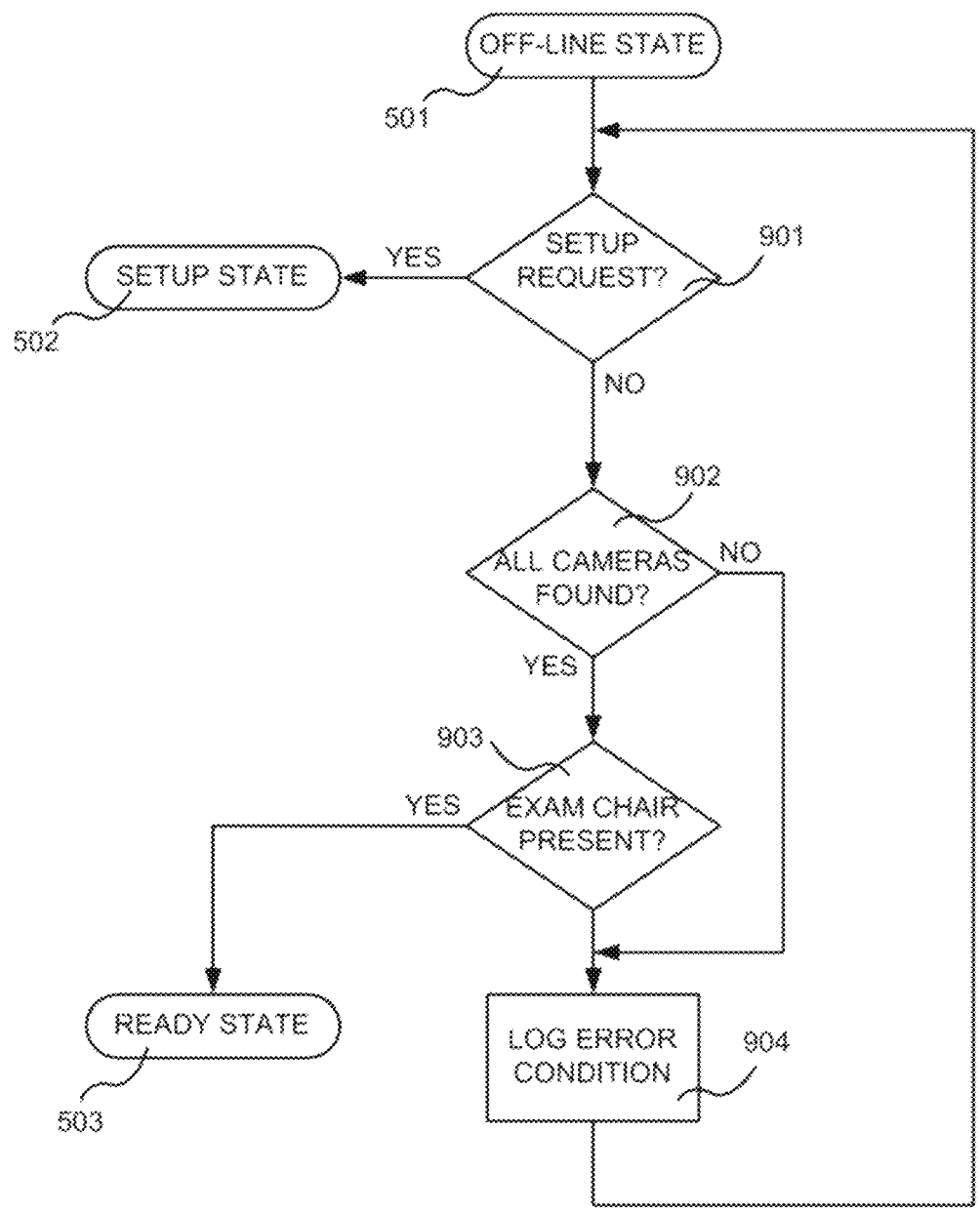
FIG. 9 shows the process that is followed to progress from the off-line to the ready or setup states after a reset condition in accordance with one embodiment of the method and system of the present disclosure.

FIG. 9 shows one embodiment of an initialization process that is followed to transition from the off-line state 501 to the setup state 502 in FIG. 5B; or ready state 503 in FIG. 5B. In this embodiment, the setup state is entered through keyboard based setup request 901. Transition to the ready state is conditioned upon determining that (a) each camera is operational by confirming that it is recognized 902 by the edge computer 101-2 and (b) the exam chair is detected 903 in accordance with the data stored during setup 805; thereby ensuring that the patient boundary area 110 properly overlaps the exam chair bounding box and patients will be reliably detected. Failure of either of these tests results in the service of an error condition 904 in the log file, and the play state manager remaining in the off-line state.

FIGS. 10, 11A-B, and 12A-B describe the selection and control of targeted video by the play state manager 402 in the current embodiment. This functionality is supported by the object manager 401 which analyzes images to determine whether there are persons in the room, the roles that any such persons have, and estimates age and gender for persons classified as patients. If necessary conditions are met, video play is then started. FIGS. 11A-B and 12A-B also illustrate embodiments of methods for causing the play of video to pause in accordance with the preferred embodiment based upon the entry of staff members into the room.

Figure 10:
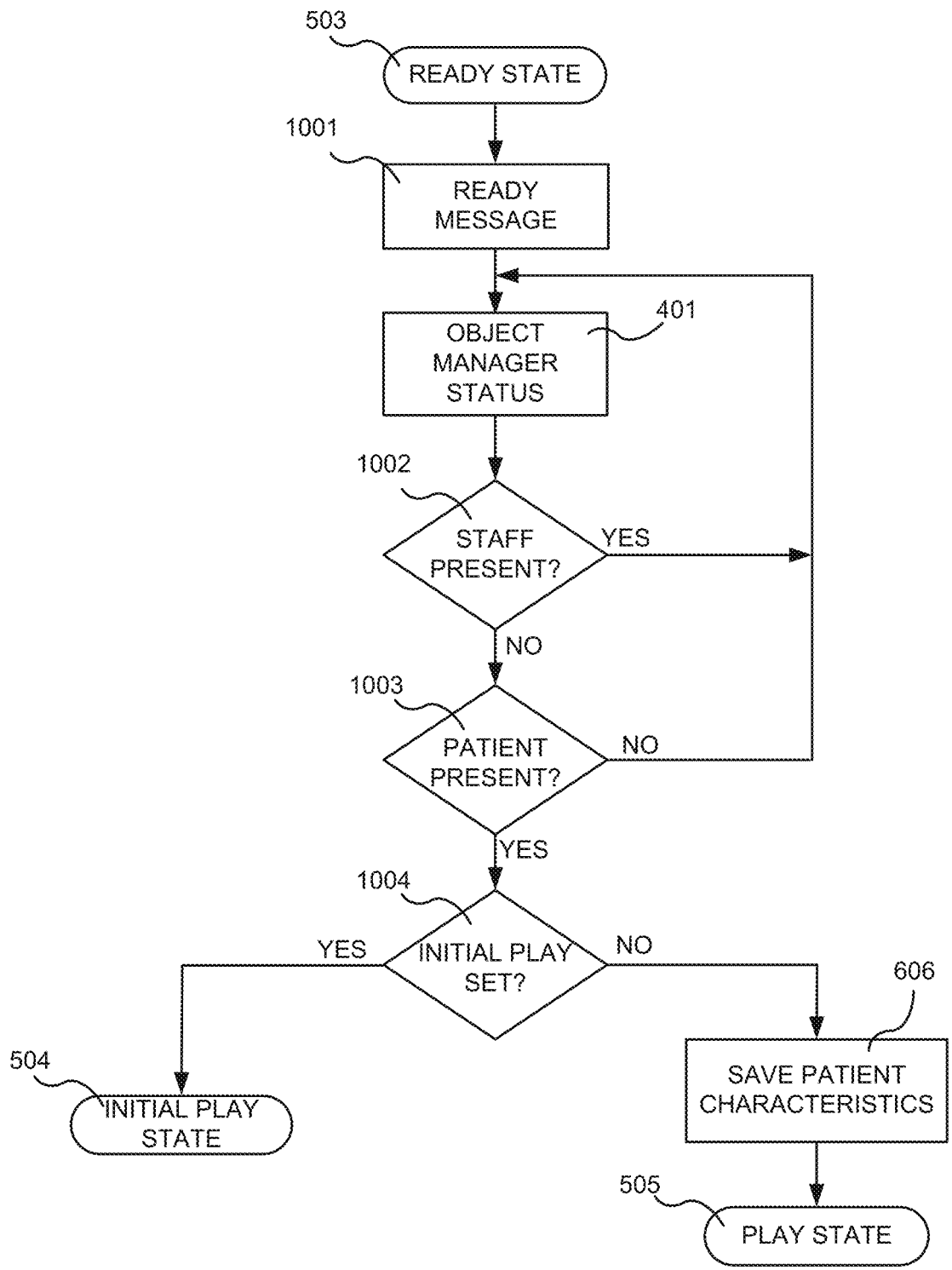
FIG. 10 shows the process that is followed in transitioning from the ready state to the play or initial play state in accordance with one embodiment of the method and system of the present disclosure.

FIG. 10 shows a process that is followed while in the ready state 503 to progress to the play 505 or initial play 504 states. On entry into the initial play state, a ready message may be sent 1001 to the CMS 302 for exam room status reporting purposes. The object manager status 401 is then retrieved for staff members 607 and patients 605. As discussed above, the method may determine, based on one or more images retrieved from the image capturers, whether any persons are present within the predefined boundary area 110. Such a person would be expected to be a patient. The method may then separately determine whether any persons are in the one or more images, but are outside of the predefined boundary area 110. Such a person would be expected to be a staff member.

If a staff member is determined to be present 1002, no action is taken until the next image is processed by the object manager. If no staff members are determined to be present, and no patient is determined to be present 1003 within the predefined boundary 110, no action is taken until the next image is processed by the object manager. Alternatively, if no staff members are determined to be present and a patient is determined to be present within the predefined boundary area 110, then depending upon the setting in the playlist 1004, either the initial play state 504 is entered or age and gender data is retrieved from the patient characteristics 606 and the play state 505 is entered.

Figure 11A:
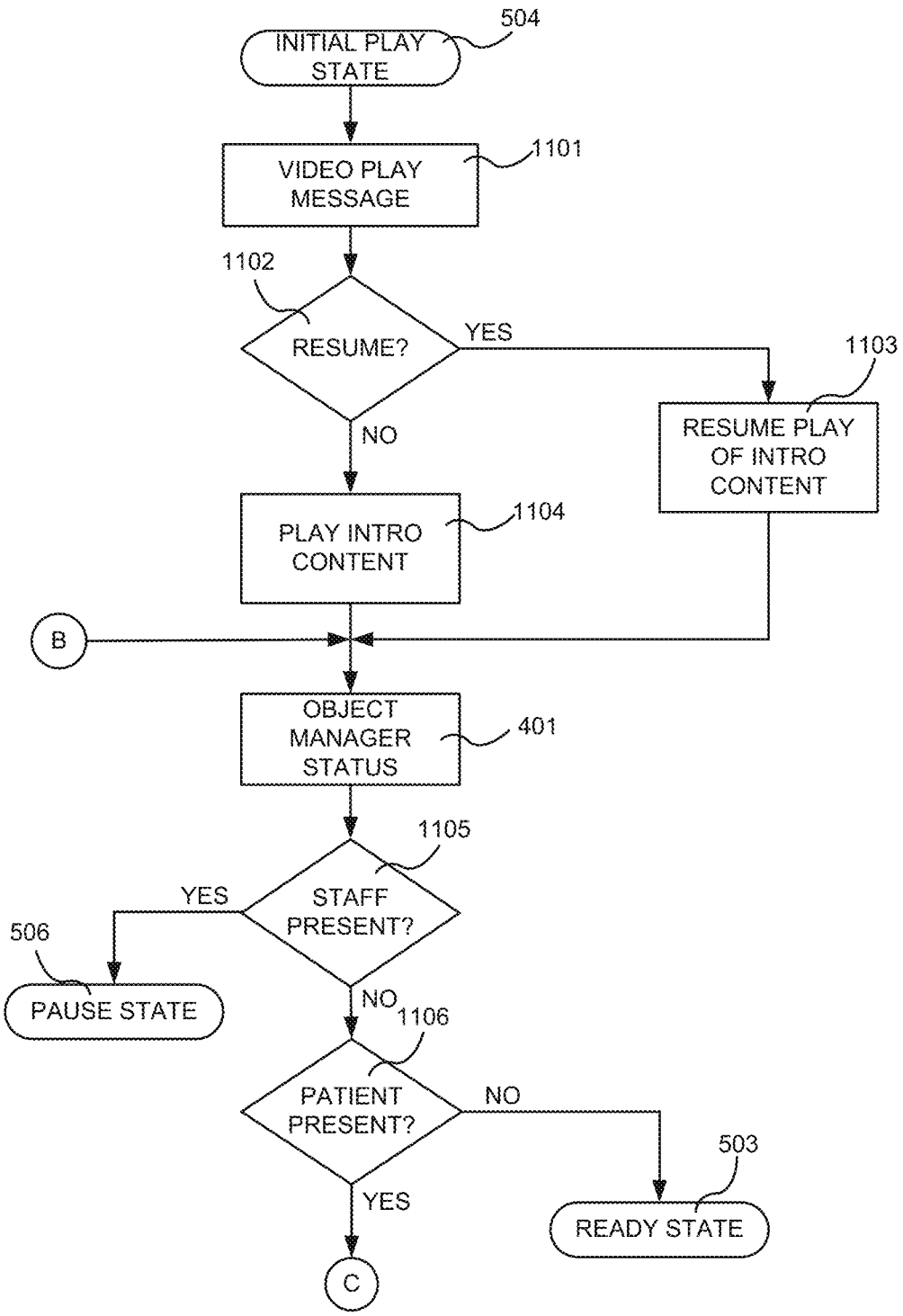
Figure 11B:
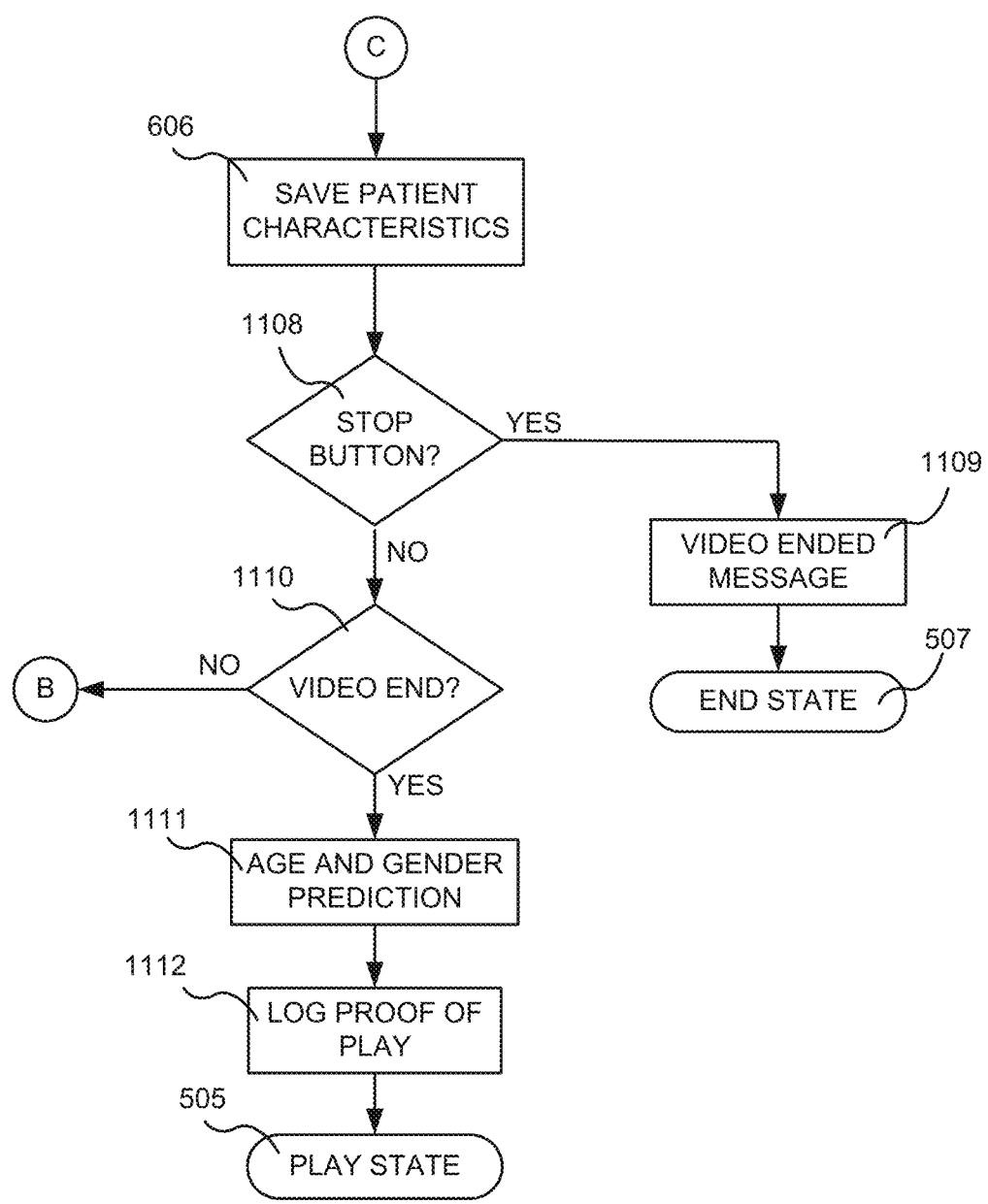

FIGS. 11A-B show a process that is followed while in the initial play state 504 to progress to the play state 505, ready state 503, pause state 506, or end state 507 described in FIGS. 5A and 5B. On entry into the initial play state 504, a video play message is typically sent 1101 to the CMS 302 for exam room status reporting purposes. If the initial play state 504 was entered by resuming 1102 from the pause state, then the media player 403 resumes play 1103 from a place where it was previously stopped in the introduction video. Otherwise, the media player starts the introduction video from the beginning 1104. As the introduction video plays, the object manager status 401 may be periodically retrieved for staff members 607 and patients 605. If a staff member is determined to be present 1105, the pause state 506 is entered. If a staff member is not determined to be present 1105 and a patient is not determined to be present 1106, then the ready state 503 is entered. If a staff member is not determined to be present 1105 and a patient is determined to be present 1106, the current age, gender, and attention estimates may be retrieved from the patient characteristics 606 and saved as part of a sample set. The status of the stop button may then be tested 1108 to determine whether the video should continue to play. If the stop button has been depressed, a video ended message is sent 1109 to the CMS for exam room status reporting and staff notification purposes and the play state manager 402 enters the end state 507. If the stop button has not been depressed, the play state of the video is checked 1110. If the video has not ended an updated object manager status 401 is obtained and the play of the introduction video continues. If the introduction video has ended, the previously saved age and gender sample set may be used to predict an age and gender value 1111 to be used for play state 505 content selection. This prediction can be based on the mean, median, or other suitable method consistent with the camera resolution and classifier technology being used in specific embodiments. Video completion, age, gender, and attention data may then be sent 1112 to the CMS for storage in the play log 406. The play state manager is then placed in the play state 505.

Figure 12A:
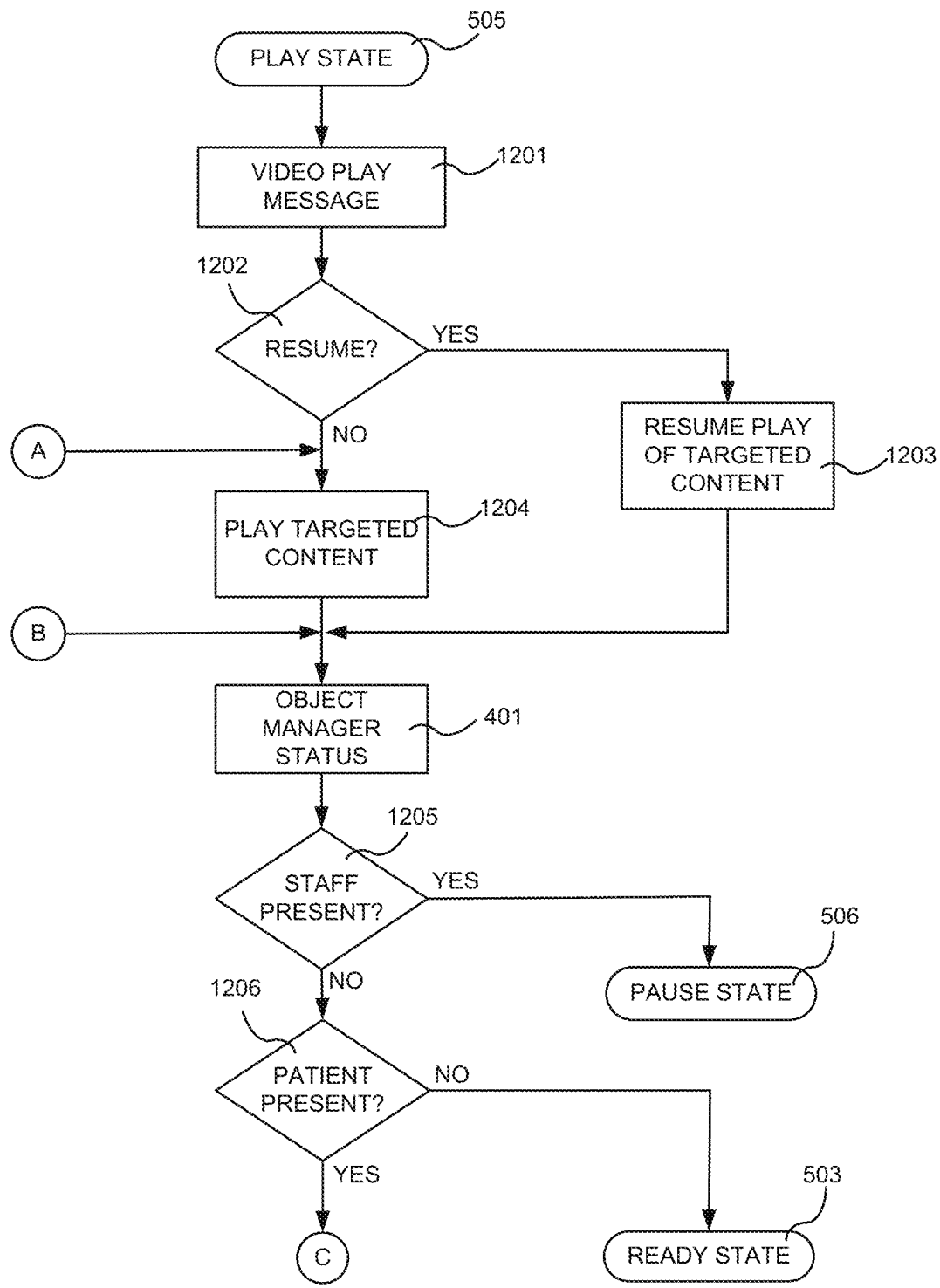
FIGS. 12A and 12B illustrate a process for transition from the play state to the pause, ready, or end states in accordance with one embodiment the method and system of the present disclosure.
Figure 12B:
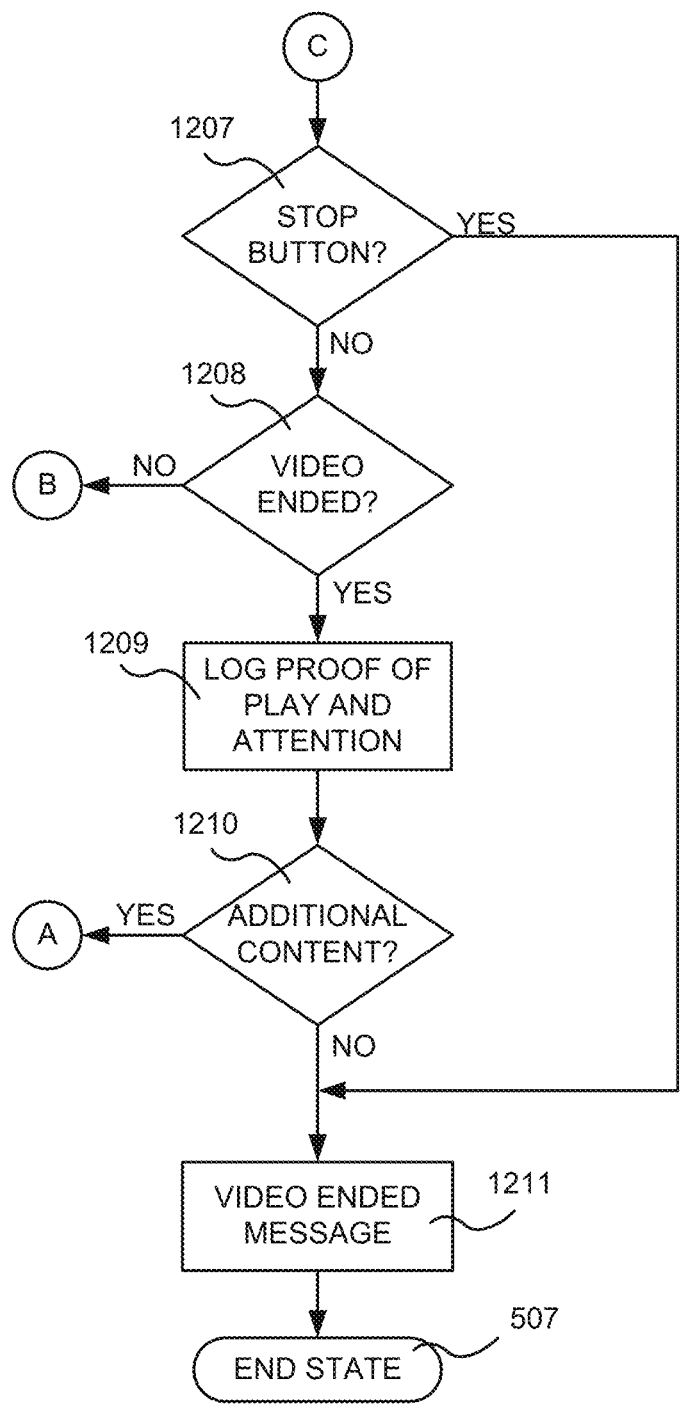

FIGS. 12A-B show one embodiment of a process that is followed within the play state 505 to progress to the end state 507, pause state 506, or ready state 503. On entry into the play state, a video play message is sent 1201 to the CMS 302 for exam room status reporting purposes. If the play state was entered from the pause state 1202, the media player 403 resumes play 1203 from the place where it was paused in the associated video. Otherwise, the media player initiates play 1204 of the next video in the playlist for the previously determined predicted age and gender. As the video plays, the object manager status 401 may be retrieved for staff members 607 and patients 605.

If a staff member is determined to be present 1205 the system enters the pause state. If a staff member is determined to be not present 1205, and a patient is determined to be not present 1206 then the ready state 503 is entered. If a patient is present 1206, the status of the stop button is then tested 1207 to determine whether the video should continue to play. If the stop button has been depressed, a video ended message is sent 1211 to the CMS for exam room status reporting and staff notification purposes, video play is stopped, and the play state manager enters the end state 507. If the stop button has not been depressed, the play state of the current video is checked for an end condition 1208. If the current video has not ended, play continues and an updated object manager status is obtained and the process described above is repeated. If the video has ended a proof of play entry consisting of the time, date, video name, patient age, gender, and attention span is made 1209 in the play log 406. If the play list has not concluded 1210, then the media player starts the next video. If the play list has concluded, a video ended message is sent 1211 to the CMS for exam room status reporting and staff notification purposes and the play state manager enters the end state 507.

Figure 13:
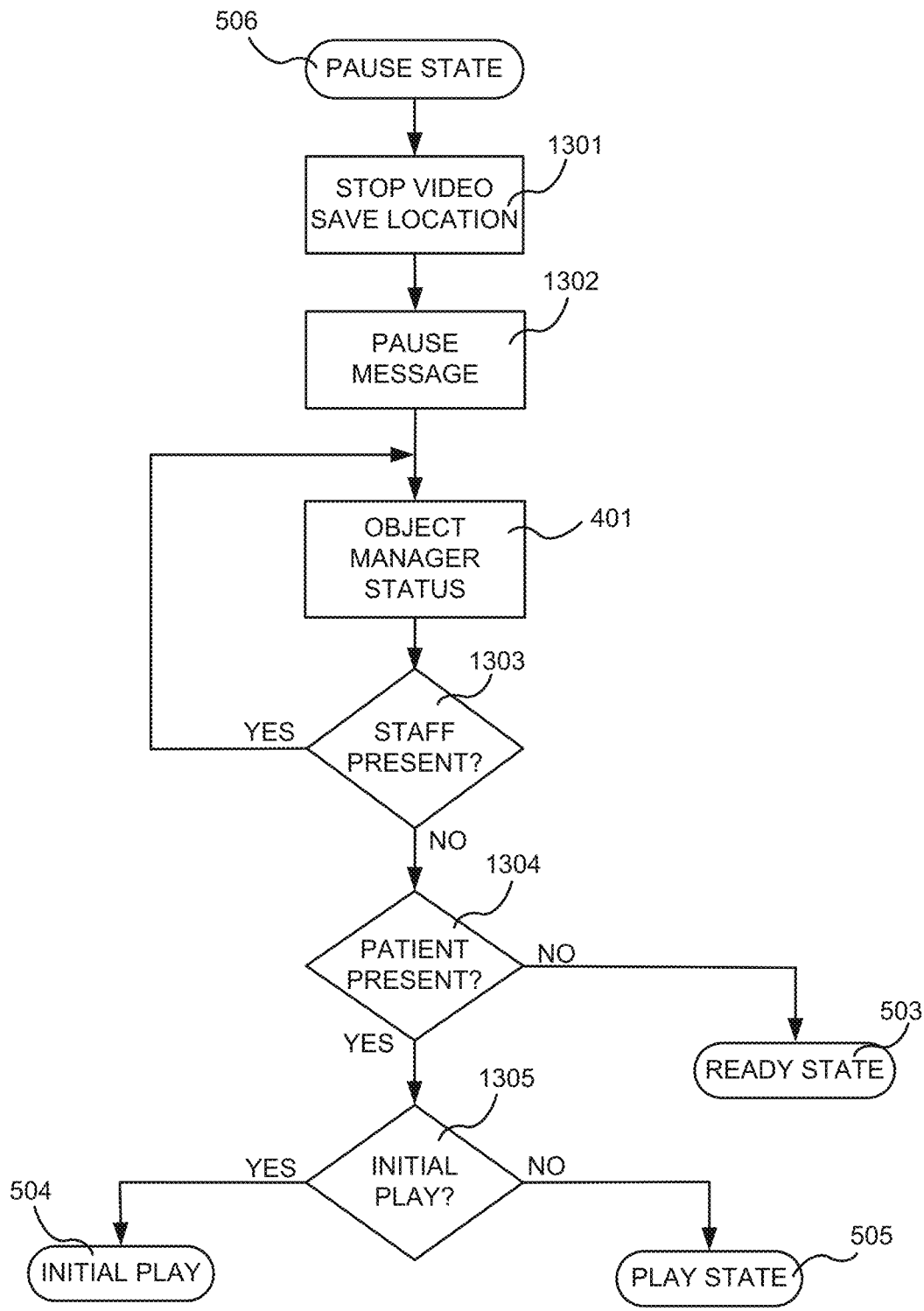
FIG. 13 illustrates one embodiment of a pause state transition to the ready or play states in accordance with one embodiment of the method and system of the present disclosure.

FIG. 13 shows one embodiment of a method progressing from the pause state 506 to the ready 503, play 505, or initial play 504 states. After entry into the pause state 506, video play is stopped 1301, the play state and location in the video is saved for use in the event that video play will resume, and no image appears on the screen. After the stopping 1301, the image sensor or camera 101-3 may continuously capture a plurality of images. The object manager status 401 is then retrieved for staff members 606 and patients 604. The pause state is maintained as long as any staff members are determined to be present 1303. If no staff members are determined to be present 1303 and no patient are determined to be present 1304 the play state manager transitions to the ready state 503. If no staff members are determined to be present 1303 and a patient is determined to be present 1304, the play state manager returns to the initial play state 504 or play state 505 in accordance with the location information in the previously saved location 1301.

Figure 14:
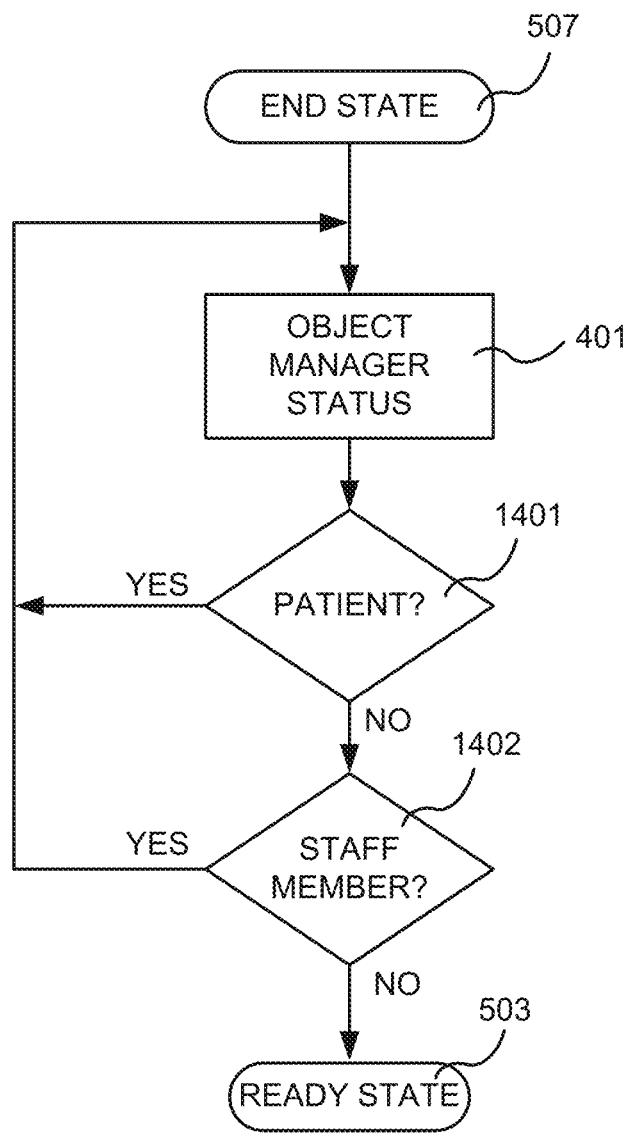
FIG. 14 illustrates a process for transition from the end to the ready state in accordance with one embodiment of the method and system of the present disclosure.

FIG. 14 shows one embodiment of a method for progressing from the end state 507 to the ready state 503. The object manager status 401 is continuously checked 1401 until it indicates there are no patients 605 or staff members 1402 in the room. When this condition is met the play state manager transitions to the ready state 503.

Figure 15:
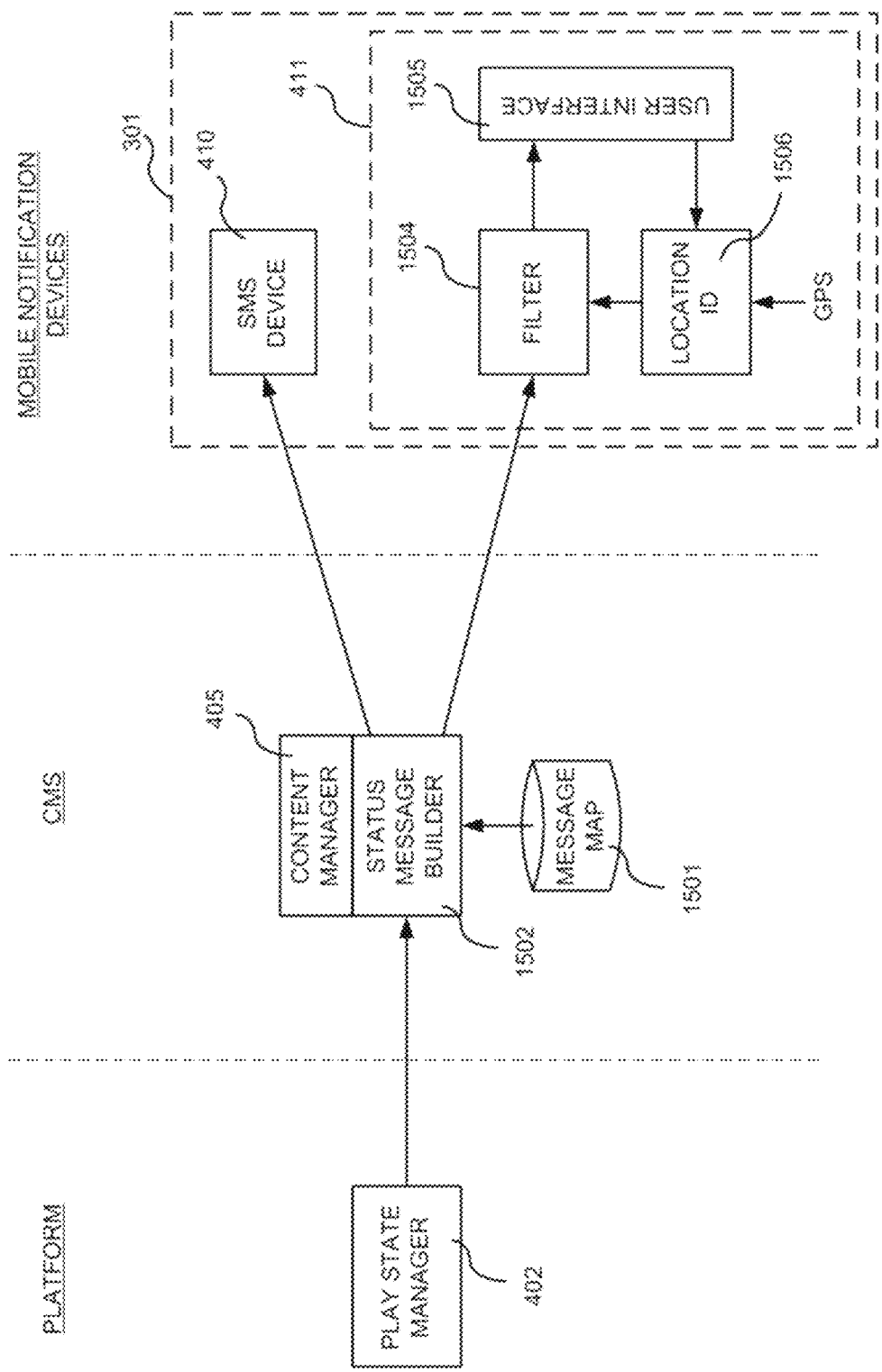
FIG. 15 shows the information flow and major functional blocks used to deliver video completed status messages to designated staff members in accordance with one embodiment of the method and system of the present disclosure.

FIG. 15 shows one embodiment of a method of alerting staff members through mobile notification devices 301 that video play has concluded and the patient is ready for treatment. This diagram includes a status message builder 1502 that is part of the content manager 405 and message maps 1501 that are part of the administrative data 407. The video ended messages 1109 and 1212 sent by play state managers 402 as each video lineup is completed cause the status message builder to generate patient ready messages in accordance with parameters contained in the message map dataset. Text messages are readily delivered through SMS devices 410 and are well suited to practices where each practitioner is interested in the status of all exam rooms because an app need not be downloaded and notifications can readily be controlled by blocking the incoming SMS phone number if messages are not desired at any point in time. Practices with multiple practitioners and/or multiple locations can benefit from an embodiment based upon mobile device applications 411 that run on smartphones or other application capable devices; in which said applications support filtering of messages 1504 based on parameters set through the user interface 1505 on the device. By way of example, this could include only displaying messages associated with specific exam rooms, providing reminder messages for patients that remain unserved for a pre-determined time period, or using the device's GPS location data 1506 to enable reporting only when the device is physically present at selected practice locations.

Figure 16:
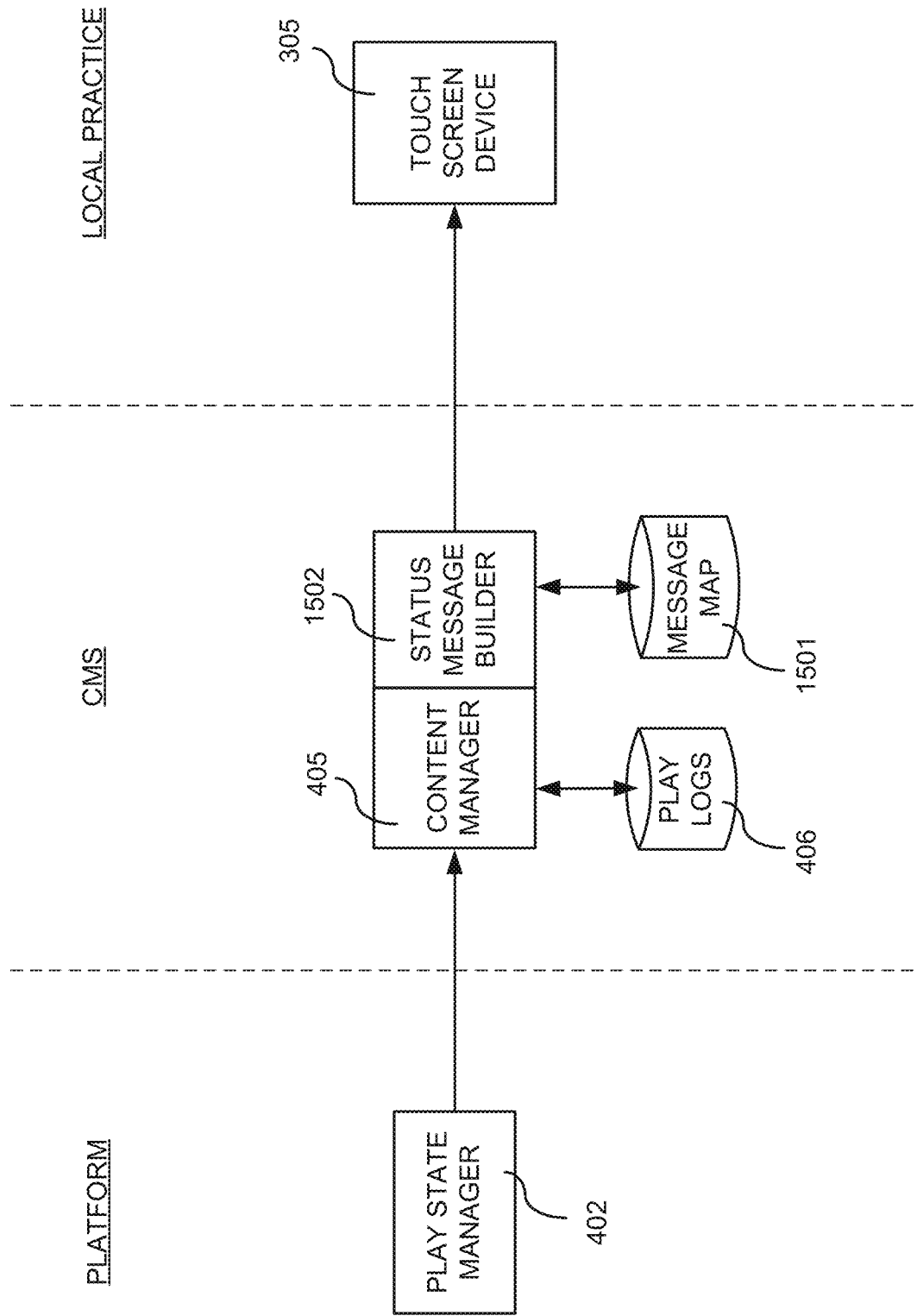
FIG. 16 a diagram that shows the information flow and major functional blocks used to display exam room status conditions in a centralized location.

FIG. 16 shows one embodiment of a method of using the exam room patient status reporting to provide staff members with actionable information regarding patient waiting times. As each patient journey progresses, the video play, patient attended, no patient, and video ended messages sent by the play state manager 402 to the content manager 405 are logged 406 as they are received for quality reporting purposes and subsequently processed by the status message builder 1502 to determine whether they should be passed to the exam room status computer 305. The CMS status message builder 1502 can then process these messages to obtain aggregate waiting time for each patient, flag patients that have wait times exceeding a pre-established threshold, and format this information as appropriate messages, including the addition of routing information contained in a message map database 1501 that correlates exam rooms with practices so that they can be delivered to the selected touch screen device where the information is formatted for visual presentation. The status display in this embodiment may include timers and color coding to enable a viewer to identify any conditions requiring corrective action and to see how long each such problem condition has existed.

For example, in some embodiments, an alarm is generated that may alert a staff member if a patient has been unattended in excess of a preset interval. Similarly, the content manager may process messages delivered to obtain an aggregate waiting time for a patient, and may indicate patients that have wait times exceeding a pre-established threshold.

Patient status information can also be aggregated and presented in a manner that makes it useful for performance analysis and management purposes; including by way of example patient waiting times, treatment times, and exam room utilization levels.

Some of the unique aspects of the present disclosure include, but are not limited to the ability to auto detect an exam/treatment chair to build boundaries for patient detection; detect objects within an empty room that could lead to erroneous results; using the number and locations of people within a room to start, pause, and reset video content; delayed start of targeted programming to get optimum face on view, provide multiple images for analysis, and time for a AI to converge; using the direction of entry of additional people to determine pause conditions; provision of a stop button to allow patient or staff to override the system.

Embodiments of the present disclosure may be optimized for environments that contain exam chairs in which a patient is (a) typically escorted into the exam/treatment room prior to the availability of the delivery of treatment and (b) is situated in a specific identifiable location. Once the patient has been seated, staff members may enter or leave the exam/treatment room thereafter for a variety of administrative or treatment related tasks, typically culminating with the arrival of the doctor or other professional primarily responsible for addressing the customer or patient's needs. These conditions can also be met for other medical specialties in which a patient is seated on an exam table, side chair, or other fixture. If the patient can be identified by his location or the fixture on which they are seated or otherwise located then the aspects of the present disclosure that include awareness of the state of the exam room can be applied. This includes the arrival and departure of staff personnel, customer/patients, and visitors that may be with them in order to play video content selected based on the customer/patient's age and gender during periods when that individual is either unattended or present with a visitor or guardian. In one aspect of the present disclosure, the system includes a video display and a video camera that are either directly or remotely connected to a computer that has been programmed to execute our methods and processes. The system and method of the present disclosure may vary depending on the nature of the environment and environment workflow.

It will therefore be understood that while the embodiments disclosed herein discuss the methods and systems in terms of examination rooms or treatment rooms, the methods may be implemented in any environment in which a person seeking service is awaiting a professional service provider. This may include waiting in a patient room for a doctor to appear and then applying methodologies to pause video when a doctor or staff member enters. Similarly, this may include waiting in a professional office, such as a legal office or an accounting office for a professional to appear.

In one embodiment, an artificial intelligence based object manager classifies persons within a room based upon their location within a camera's field of view; or the location where they entered that field of view. A play state manager then applies business rules to these classifications to determine whether to start, pause, or stop content. In addition, a content manager uses information provided by the play state manager to select content to be played based on the demographics of a single viewer. This embodiment can be implemented using a wide variety of hardware and software configurations.

In one embodiment, role determination may be based upon a sequence of image frames from a video stream to automatically determine the number of people in the room, their location relative to seats and work areas, and, optionally, selected identifying physical attributes that can be compared with information in an automatically generated database. The visually perceptible attributes can include height, hair color, location of head features from side and face on perspectives. In one embodiment, video content is started when customers are unaccompanied by staff members, paused when staff members enter the room, and can be resumed should staff members leave the customer unattended.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The embodiments of the disclosure disclosed herein may comprise a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Perl, Python or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and/or computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A processor or processor circuitry may include a device that has any combination of hardware, circuitry, and software. The hardware and circuitry examples may comprise a parallel processor, a processor array, a vector processor, a scalar processor, a multi-processor, a microprocessor, a communication processor, a network processor, a logic circuit, a queue management device, a central processing unit (CPU), a microprocessing unit (MPU), system on a chip (SoC), a digital signal processor (DSP), an integrated circuit (IC), an application specific integrated circuit (ASIC), a programmable logic device (PLD), and a field programmable gate array (FPGA). A processor or processor circuitry may include one or more processors, one or more circuits and/or software, that responds to and processes basic computer instructions and carries out the instructions of a computer program by performing the basic arithmetic, logical, control and input/output (I/O) operations specified by the instructions, one or more of: an arithmetic logic unit (ALU), which may carry out arithmetic and logic operations on the operands in instructions; a floating point unit (FPU), also known as a math coprocessor or numeric coprocessor, which is a specialized coprocessor that may manipulate numbers more quickly than the basic microprocessor circuitry can in some cases; one or more registers, which may hold instructions and other data and supply operands to the ALU and store the results of operations; and cache memory, which may save time compared to having to get data from random access memory (RAM). A processor or processor circuitry may also include one or more circuits comprising electronic components, such as resistors, memories, power sources, magnetic devices, motors, generators, solenoids, microphones, speakers, transistors, capacitors, inductors, diodes, semiconductors, switches, antennas, transducers, sensors, detectors, vacuums, tubes, amplifiers, radio receivers, crystals, and oscillators connected by conductive wires or traces through which electric current can flow. The combination of components and wires may allow various simple and complex operations to be performed: signals may be amplified, computations can be performed, and data can be moved from one place to another.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the disclosure in terms of embodiments foreseen by the inventor for which an enabling description was available, notwithstanding that insubstantial modifications of the disclosure, not presently foreseen, may nonetheless represent equivalents thereto.

What is claimed is:

1. A method using a computing device to initiate play of media comprising:
   capturing a plurality of images by one or more image capturers;
   determining whether any persons are within a first zone defined by a predefined boundary area in one or more of said images using a face detector or person detector, wherein any person determined to be within the first zone is defined as a potential viewer of media;
   determining whether any persons are within a second zone outside of said boundary area in one or more of said images using the person detector, wherein any person determined to be within the second zone is defined as a media play preventer; and
   initiating play of media from its predefined beginning upon determining both that a potential viewer of media is within the first zone and that no media play preventer is within the second zone.

2. The method of claim 1, further comprising:
   determining a facial signature for the potential viewer of media;
   comparing said facial signature to data within a pre-existing sample facial signature repository; and preventing the initiation of play of media if said facial signature matches a sample facial signature in said repository.

3. The method according to claim 1, further comprising:
estimating at least one of an age and a gender of the potential viewer of media by a deep neural network using a face detector; and
selecting media to be played based at least partially on the estimated at least one of age and gender.

4. The method of claim 1, wherein the first and second zones are both located within the same room and y coordinate filtering is used to (a) distinguish persons near doorways outside said room from persons inside said room or (b) differentiate persons within the first zone from persons within the second zone.

5. The method of claim 1, wherein capturing the plurality of images by the one or more image capturers further comprises determining a location of persons within a field of the image capturer to (a) distinguish persons near doorways outside a room from persons inside said room, where the first zone and the second zone are both located within the room or (b) differentiate persons within the first zone from persons within the second zone.

6. The method of claim 1, wherein persons in a room containing the first zone have access to a stop control that causes media play to stop and prevents any play of media from resuming until a pre-defined condition for resumption of play has been met.

7. The method of claim 1, wherein the determination of whether any persons are within the first zone identifies only persons wholly within the predefined boundary area, and the determination of whether any persons in the second zone identifies only persons who are in the images but wholly outside the boundary area.

8. The method of claim 1, further comprising:
after initiating play of media, capturing at least one additional image by the one or more image capturers;
determining whether a person has entered the field of view from a predefined visitor area in the at least one additional image;
designating said additional person to be a visitor
preventing the presence of such designated visitor from stopping the play of media.

9. The method of claim 1, further comprising:
after initiating play of media, capturing at least one additional image by the one or more image capturers;
determining whether any persons are within the second zone in the at least one additional image, wherein any person determined to be within the second zone in the at least one additional image is defined as a play stopper; and
stopping the play of media if any media play stopper is determined to be in the second zone in the at least one additional image.

10. The method of claim 9, further comprising setting a lockout indicating presence of a media play stopper in the second zone to prevent any play of media from resuming until a pre-defined condition for resumption of play has been met.

11. The method of claim 9, further comprising:
after stopping the play of media, capturing at least one additional image by the one or more image capturers;
determining that if a doorway is identified in a field of view of the one or more image capturers, that any persons visible in the at least one additional image are outside the doorway, and that if no doorway is identified in the field of view, no media play stopper is in the second zone in the at least one additional image; and
causing play of media to resume.

12. The method of claim 10, further comprising:
after setting a lockout:
determining that an individual is detected as having left a room containing the first zone by passing through a door that is within a field of view or exiting a door side field of view of the one or more image capturers;
clearing said lockout to allow media to resume play.

13. The method of claim 1, further comprising:
determining that said media has concluded play, reached a notification token in a playlist, or a media stop request has been made through a stop control; and
sending a message to at least one previously identified mobile device indicating that a patient is available, the message containing an identity of the corresponding room in which said media played.

14. The method of claim 1, further comprising:
determining that said media has concluded play, reached a notification token in a playlist, or a media stop request has been made through a stop control; and
sending a message through a network to a mobile notification application indicating that the potential viewer of media is available, the message including a location in which said media played;
wherein said mobile notification application causes a message to be displayed that indicates that the potential viewer of media is ready.

15. The method of claim 14, wherein the message is only displayed at the mobile device if the corresponding location is in geographical proximity to the mobile device as indicated by pre-set GPS coordinates.

16. The method of claim 14, wherein a mobile notification application that transmits the message supports filtering of messages associated with a specific geographical location by room within said location.

17. The method of claim 14, wherein an alarm is provided each time that a potential viewer of media remains unattended in excess of a preset interval.

18. The method of claim 1, further comprising:
determining that said media has concluded play, reached a notification token in a playlist, or a media stop request has been made through a stop control;
sending a first message through a network to a centralized application, the first message indicating that the potential viewer of media is available, the first message including a location in which said media played and the time at which said potential viewer of media was initially detected;
wherein said centralized application adds the potential viewer of media to a listing of persons, wherein the listing of persons is displayed along with a periodically updated time the potential viewer of media has been unattended; and
sending a second message through the network to the centralized application, the second message indicating that an additional person has entered the room, the second message including a location in which said media played and the time at which said potential viewer of media was no longer alone;
wherein said centralized application causes a notice to be displayed that the potential viewer of media is no longer unattended.

19. A system for initiating play of media, comprising:
a single or plurality of image capturers configured to capture a plurality of images;

a face detector or person detector;
a storage configured to store media: and
processor circuitry configured to:
- determine whether any persons are within a first zone defined by a predefined boundary area in one or more of said images using the face detector or person detector, wherein any person determined to be within the first zone is defined as a potential viewer of media;
- determine whether any persons are within a second zone outside of said boundary area in one or more of said images using the face detector or person detector, wherein any person determined to be within the second zone is defined as a media play preventer; and
- initiate play of the media from its predefined beginning upon determining both that a potential viewer of media is within the first zone and that no media play preventer is within the second zone.

\* \* \* \* \*